US010631520B2

(12) United States Patent
Sayers et al.

(10) Patent No.: US 10,631,520 B2
(45) Date of Patent: Apr. 28, 2020

(54) AUTOMATIC ANIMAL FEEDING SYSTEM

(71) Applicant: Radio Systems Corporation, Knoxville, TN (US)

(72) Inventors: Kevin Michael Sayers, Kodak, TN (US); Jonathan L. Cornwell, Powell, TN (US); Chad Larry Elmore, Knoxville, TN (US); Melissa M. Poisson, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 8 days.

(21) Appl. No.: 14/308,191

(22) Filed: Jun. 18, 2014

(65) Prior Publication Data
US 2016/0000036 A1 Jan. 7, 2016

Related U.S. Application Data

(60) Provisional application No. 61/836,711, filed on Jun. 19, 2013.

(51) Int. Cl.
*A01K 5/02* (2006.01)
*A01K 5/01* (2006.01)

(52) U.S. Cl.
CPC .......... *A01K 5/0291* (2013.01); *A01K 5/0114* (2013.01)

(58) Field of Classification Search
CPC ...... A01K 5/0291; A01K 5/0225; A01K 5/02; A01K 5/0275; A01K 5/0114; A01K 5/01;
(Continued)

(56) References Cited

U.S. PATENT DOCUMENTS 1,278,285 A 9/1918 Allen et al.
1,481,365 A 1/1924 William et al.
(Continued)

FOREIGN PATENT DOCUMENTS

AU 2014334919 6/2017
CA 682630 A 3/1964
(Continued)

OTHER PUBLICATIONS

Petnet Pet Feeder available through www.petnet.io (accessed Apr. 6, 2015).
(Continued)

*Primary Examiner* — Peter M Poon
*Assistant Examiner* — Jeffrey R Larsen
(74) *Attorney, Agent, or Firm* — Baker, Donelson, Bearman, Caldwell & Berkowitz PC

(57) ABSTRACT

An animal feeding system is provided. The feeding system includes a container that holds dry pet food, and a receptacle that gravitationally receives the pet food. The system also provides a conveyor system. The conveyor system moves the dry pet food from the receptacle to a feeding bowl. Additionally, the animal feeding system includes a processor. The processor is configured to deliver start and stop signals to a motor in response to signals sent from a user control unit. The animal feeding system additionally comprises the user control unit. The control unit offers a user interface for programming the system according to a desired feeding schedule. A method for feeding an animal using the feeding system is also provided herein.

38 Claims, 19 Drawing Sheets

(58) Field of Classification Search
CPC .... A01K 39/012; A01K 5/0208; A01K 39/01; A01K 11/006; A01K 15/021
USPC .......... 119/51.11, 57.92, 51.01, 57.1, 51.02, 119/52.1, 53, 57.7, 210, 457, 476; 222/650, 638, 52, 63
See application file for complete search history.

(56) References Cited

U.S. PATENT DOCUMENTS

| | | | |
|---|---|---|---|
| 2,034,968 A | 3/1936 | Bartlett et al. | |
| 2,103,653 A | 12/1937 | Weil et al. | |
| 2,366,766 A | 1/1945 | Charles et al. | |
| 2,510,212 A * | 6/1950 | Donnell | B65G 15/44 |
| | | | 198/711 |
| 2,510,252 A | 6/1950 | Morton et al. | |
| 2,510,446 A | 6/1950 | Weil et al. | |
| 2,572,379 A | 10/1951 | Jeffrey et al. | |
| 2,678,630 A | 5/1954 | Frederiksen et al. | |
| 2,726,636 A | 12/1955 | Frederiksen et al. | |
| 2,775,227 A | 12/1956 | Henry et al. | |
| 2,878,781 A | 3/1959 | Otto et al. | |
| 3,179,085 A | 4/1965 | McKillip, Jr. | |
| 3,228,377 A | 1/1966 | Vincent et al. | |
| 3,272,181 A | 9/1966 | Ramsey et al. | |
| 3,459,159 A | 8/1969 | Reed et al. | |
| 3,505,978 A | 4/1970 | Nilsen et al. | |
| 3,537,430 A | 11/1970 | Peppler et al. | |
| 3,777,714 A | 12/1973 | Danielsson et al. | |
| 3,831,558 A | 8/1974 | Forbes et al. | |
| 3,853,429 A | 12/1974 | Wiedenmann et al. | |
| 3,868,926 A | 3/1975 | Olde et al. | |
| 3,897,753 A | 8/1975 | Lee et al. | |
| 3,901,191 A | 8/1975 | Smith et al. | |
| 3,903,845 A | 9/1975 | Little et al. | |
| 3,920,224 A | 11/1975 | Fassauer | |
| 3,979,055 A * | 9/1976 | Fathauer | G01G 11/18 |
| | | | 177/16 |
| 4,022,159 A | 5/1977 | Salvia et al. | |
| 4,098,229 A | 7/1978 | Haynes et al. | |
| 4,248,177 A | 2/1981 | Peterson et al. | |
| 4,347,809 A | 9/1982 | Gloggler et al. | |
| 4,386,582 A | 6/1983 | Adsit et al. | |
| 4,463,706 A | 8/1984 | Meister et al. | |
| 4,469,049 A | 9/1984 | Waynick et al. | |
| 4,512,885 A | 4/1985 | Willinger et al. | |
| 4,573,433 A | 3/1986 | Thompson et al. | |
| 4,584,966 A | 4/1986 | Moore et al. | |
| 4,705,216 A | 11/1987 | Kaffka et al. | |
| 4,735,171 A | 4/1988 | Essex | |
| 4,747,538 A | 5/1988 | Dunn et al. | |
| 4,782,790 A | 11/1988 | Batson | |
| 4,807,565 A | 2/1989 | Hawthorne et al. | |
| 4,836,142 A | 6/1989 | Duback et al. | |
| 4,924,812 A | 5/1990 | Bernays, Jr. et al. | |
| 4,976,220 A | 12/1990 | Gershman et al. | |
| 4,979,670 A * | 12/1990 | Konle | G06M 7/10 |
| | | | 116/204 |
| 4,993,364 A * | 2/1991 | Hessenauer | A01K 5/0291 |
| | | | 119/51.11 |
| 5,052,343 A | 10/1991 | Sushelnitski et al. | |
| 5,122,274 A | 6/1992 | Heskett | |
| 5,135,654 A | 8/1992 | Heskett | |
| 5,149,437 A | 9/1992 | Wilkinson et al. | |
| 5,167,368 A | 12/1992 | Nash et al. | |
| 5,198,118 A | 3/1993 | Heskett | |
| 5,247,963 A | 9/1993 | Hostetler et al. | |
| 5,269,919 A | 12/1993 | Von Medlin | |
| 5,269,932 A | 12/1993 | Heskett | |
| 5,275,737 A | 1/1994 | Heskett | |
| 5,314,623 A | 5/1994 | Heskett | |
| 5,329,876 A | 7/1994 | Tracy et al. | |
| D350,842 S | 9/1994 | Vanskiver | |
| 5,349,925 A | 9/1994 | Zerato et al. | |
| 5,369,032 A | 11/1994 | Pratt et al. | |
| 5,415,770 A | 5/1995 | Heskett | |
| 5,433,171 A * | 7/1995 | Ewell | A01K 5/0291 |
| | | | 119/51.5 |
| 5,433,856 A | 7/1995 | Heskett | |
| 5,483,923 A | 1/1996 | Sabbara | |
| D367,735 S | 3/1996 | Vanskiver | |
| 5,501,178 A | 3/1996 | Kemp et al. | |
| 5,510,034 A | 4/1996 | Heskett | |
| D374,516 S | 10/1996 | Lillelund | |
| 5,599,454 A | 2/1997 | Heskett | |
| 5,637,361 A | 6/1997 | Scheurich et al. | |
| D383,797 S | 9/1997 | Finnegan | |
| 5,778,820 A | 7/1998 | van der Lely et al. | |
| 5,799,609 A | 9/1998 | Burns et al. | |
| 5,833,859 A | 11/1998 | Heskett | |
| 5,837,134 A | 11/1998 | Heskett | |
| D402,425 S | 12/1998 | Lacz | |
| 5,842,437 A | 12/1998 | Burns et al. | |
| 5,934,223 A | 8/1999 | Ellery-Guy | |
| 5,951,869 A | 9/1999 | Heskett | |
| 5,992,349 A * | 11/1999 | Sachs | A01K 5/0225 |
| | | | 119/52.1 |
| 6,044,795 A | 4/2000 | Matsuura | |
| 6,055,934 A | 5/2000 | Burns et al. | |
| D428,217 S | 7/2000 | Rodack | |
| 6,135,056 A | 10/2000 | Kuo | |
| 6,149,070 A | 11/2000 | Hones et al. | |
| D435,321 S | 12/2000 | Avila | |
| 6,197,204 B1 | 3/2001 | Heskett | |
| 6,257,560 B1 | 7/2001 | Kim et al. | |
| 6,367,417 B1 | 4/2002 | Gal | |
| D457,692 S | 5/2002 | Skurdalsvold et al. | |
| 6,401,657 B1 | 6/2002 | Krishnamurthy | |
| 6,460,483 B1 | 10/2002 | Northrop et al. | |
| 6,467,428 B1 | 10/2002 | Andrisin | |
| 6,526,916 B1 | 3/2003 | Perlsweig et al. | |
| 6,622,657 B2 | 9/2003 | Northrop et al. | |
| 6,651,591 B1 | 11/2003 | Chelen | |
| 6,651,592 B2 | 11/2003 | Maddox et al. | |
| 6,655,934 B2 | 12/2003 | Mittelstein et al. | |
| 6,672,253 B1 | 1/2004 | Viola | |
| 6,694,916 B1 | 2/2004 | Rucker et al. | |
| D490,577 S | 5/2004 | Steinbacher et al. | |
| 6,733,356 B2 | 5/2004 | Lee | |
| 6,748,669 B1 | 6/2004 | Burgess et al. | |
| 6,748,699 B2 | 6/2004 | Taylor | |
| 6,792,891 B1 | 9/2004 | Coburn et al. | |
| 6,845,735 B1 | 1/2005 | Northrop | |
| D503,247 S | 3/2005 | Ross et al. | |
| 6,863,025 B2 | 3/2005 | Ness | |
| D506,352 S | 6/2005 | Dow et al. | |
| D507,755 S | 7/2005 | Reitze et al. | |
| D513,930 S | 1/2006 | Novi et al. | |
| 6,983,722 B2 | 1/2006 | Tepper et al. | |
| 6,988,465 B2 | 1/2006 | Park | |
| 6,990,927 B2 | 1/2006 | Axelrod | |
| 7,040,249 B1 | 5/2006 | Mushen | |
| D522,807 S | 6/2006 | Dow et al. | |
| D527,224 S | 8/2006 | Roth et al. | |
| 7,089,881 B2 | 8/2006 | Plante et al. | |
| D527,951 S | 9/2006 | Roth et al. | |
| D527,954 S | 9/2006 | Roth et al. | |
| 7,124,707 B1 | 10/2006 | Clarke | |
| 7,146,930 B1 | 12/2006 | Ness | |
| D538,041 S | 3/2007 | Reitze et al. | |
| 7,198,005 B2 | 4/2007 | Polimeni | |
| 7,228,816 B2 * | 6/2007 | Turner | A01K 5/0114 |
| | | | 119/51.02 |
| 7,270,081 B2 | 9/2007 | Park | |
| 7,270,082 B2 | 9/2007 | Plante et al. | |
| D556,511 S | 12/2007 | Mansfield et al. | |
| D558,519 S | 1/2008 | Zemel et al. | |
| D559,472 S | 1/2008 | Abinanti et al. | |
| D562,074 S | 2/2008 | Mansfield et al. | |
| D563,605 S | 3/2008 | Morris | |
| D564,286 S | 3/2008 | Zemel et al. | |
| 7,380,518 B2 | 6/2008 | Kates | |
| 7,389,748 B2 | 6/2008 | Shatoff et al. | |
| RE40,430 E | 7/2008 | Markham | |

(56) References Cited

U.S. PATENT DOCUMENTS

| | | | |
|---|---|---|---|
| D572,533 S | 7/2008 | Mansfield et al. | |
| 7,395,782 B1 | 7/2008 | Lindsay | |
| D574,183 S | 8/2008 | Broom et al. | |
| D575,986 S | 9/2008 | Cetera et al. | |
| 7,426,901 B2 | 9/2008 | Turner | |
| 7,430,988 B2 | 10/2008 | Perlsweig et al. | |
| 7,458,336 B2 | 12/2008 | Eu et al. | |
| 7,467,603 B2 | 12/2008 | Davies | |
| 7,472,785 B2 * | 1/2009 | Albright | B65G 41/005 198/369.2 |
| D587,529 S | 3/2009 | Pratt et al. | |
| 7,513,216 B2 | 4/2009 | Neckel | |
| D596,461 S | 7/2009 | Mansfield et al. | |
| D598,224 S | 8/2009 | Zanini et al. | |
| 7,624,702 B1 | 12/2009 | Fritz et al. | |
| 7,647,894 B2 | 1/2010 | Axelrod et al. | |
| 7,757,636 B2 | 7/2010 | McCallum et al. | |
| D621,556 S | 8/2010 | Hewson et al. | |
| 7,832,362 B2 | 11/2010 | Deghionno | |
| D629,974 S | 12/2010 | Northrop et al. | |
| 7,849,817 B1 | 12/2010 | Warganich | |
| 7,909,003 B2 | 3/2011 | Willinger | |
| 7,914,468 B2 | 3/2011 | Shalon | |
| D636,539 S | 4/2011 | Montoya et al. | |
| 7,918,186 B2 | 4/2011 | Rowe et al. | |
| D637,770 S | 5/2011 | Lipscomb et al. | |
| 7,946,251 B2 | 5/2011 | Hass | |
| 7,958,844 B1 | 6/2011 | Northrop et al. | |
| 7,984,694 B2 | 7/2011 | Wu | |
| D642,745 S | 8/2011 | Veness et al. | |
| D642,746 S | 8/2011 | Weber et al. | |
| 7,987,817 B2 | 8/2011 | Johnson et al. | |
| 8,011,205 B2 | 9/2011 | Roth et al. | |
| 8,011,324 B1 | 9/2011 | Warganich | |
| D648,904 S | 11/2011 | Tedaldi et al. | |
| D650,861 S | 12/2011 | Chuang et al. | |
| 8,100,084 B1 | 1/2012 | Abramson | |
| 8,141,521 B2 | 3/2012 | Shatoff et al. | |
| 8,146,538 B2 | 4/2012 | Kling et al. | |
| 8,153,176 B2 | 4/2012 | Etayo Garralda et al. | |
| D658,818 S | 5/2012 | Lipscomb et al. | |
| D658,819 S | 5/2012 | Lipscomb et al. | |
| D659,301 S | 5/2012 | Lipscomb et al. | |
| D659,914 S | 5/2012 | Lipscomb et al. | |
| 8,166,922 B2 | 5/2012 | Jalbert | |
| 8,171,885 B1 | 5/2012 | Northrop et al. | |
| 8,225,747 B2 | 7/2012 | Markham et al. | |
| D665,134 S | 8/2012 | Lipscomb et al. | |
| D665,870 S | 8/2012 | Fang et al. | |
| 8,245,665 B2 | 8/2012 | Willett | |
| 8,347,817 B1 | 1/2013 | Miller | |
| D677,018 S | 2/2013 | Miller et al. | |
| 8,367,130 B1 | 2/2013 | Tsengas | |
| 8,381,685 B2 | 2/2013 | Lipscomb et al. | |
| 8,387,566 B2 | 3/2013 | Graves | |
| D681,887 S | 5/2013 | Fang et al. | |
| D681,888 S | 5/2013 | Fang et al. | |
| 8,436,735 B2 | 5/2013 | Mainini | |
| 8,464,664 B1 | 6/2013 | Scheffler | |
| D686,783 S | 7/2013 | Pluss et al. | |
| 8,474,404 B2 | 7/2013 | Costello | |
| 8,511,255 B2 | 8/2013 | Hass et al. | |
| 8,516,975 B2 | 8/2013 | Becattini | |
| 8,516,977 B2 | 8/2013 | Shatoff et al. | |
| D689,245 S | 9/2013 | Rowe et al. | |
| D692,623 S | 10/2013 | Lipscomb et al. | |
| 8,555,814 B2 | 10/2013 | Parks | |
| D694,477 S | 11/2013 | Rowe et al. | |
| 8,701,595 B2 * | 4/2014 | Jin | A01K 5/0291 119/51.01 |
| D704,388 S | 5/2014 | Fang et al. | |
| D704,389 S | 5/2014 | Fang et al. | |
| D704,392 S | 5/2014 | Fang et al. | |
| D704,903 S | 5/2014 | Fang et al. | |
| 8,714,112 B2 | 5/2014 | Kling et al. | |
| D709,655 S | 7/2014 | Lipscomb et al. | |
| 8,770,147 B2 | 7/2014 | Rowe et al. | |
| 8,776,725 B1 * | 7/2014 | Grijalva | A01K 5/0114 119/51.01 |
| 8,800,494 B2 | 8/2014 | Lipscomb | |
| 8,875,658 B2 | 11/2014 | Anderson et al. | |
| 8,893,653 B2 * | 11/2014 | Browning | A01K 39/014 119/51.11 |
| 8,904,967 B2 | 12/2014 | Reiss et al. | |
| 8,925,485 B2 | 1/2015 | Pu et al. | |
| 8,944,006 B2 * | 2/2015 | Anderson | A01K 5/01 119/51.01 |
| 9,004,011 B2 | 4/2015 | Foley | |
| 9,004,012 B2 | 4/2015 | Taylor | |
| 9,060,528 B2 | 6/2015 | Axelrod | |
| 9,156,950 B2 | 10/2015 | Etayo Garralda et al. | |
| 9,260,223 B2 | 2/2016 | Kim et al. | |
| 9,295,233 B2 | 3/2016 | Axelrod et al. | |
| 9,301,496 B2 | 4/2016 | Reiss et al. | |
| 9,339,011 B1 | 5/2016 | Crabtree | |
| 2002/0189548 A1 | 12/2002 | Northrop et al. | |
| 2002/0195001 A1 | 12/2002 | Hester et al. | |
| 2004/0118356 A1 | 6/2004 | Krishnamurthy et al. | |
| 2004/0194714 A1 * | 10/2004 | Lee | A01K 5/0114 119/54 |
| 2005/0061252 A1 | 3/2005 | Meeks | |
| 2005/0166853 A1 | 8/2005 | Plante et al. | |
| 2005/0217591 A1 | 10/2005 | Turner | |
| 2005/0284382 A1 | 12/2005 | Stantchev | |
| 2006/0011145 A1 | 1/2006 | Kates et al. | |
| 2006/0027179 A1 | 2/2006 | Welbourne et al. | |
| 2006/0231040 A1 | 10/2006 | Bast et al. | |
| 2006/0236948 A1 | 10/2006 | Wechsler et al. | |
| 2007/0266959 A1 | 11/2007 | Brooks | |
| 2008/0011243 A1 | 1/2008 | Moulton | |
| 2008/0058670 A1 | 3/2008 | Mainini | |
| 2008/0127904 A1 | 6/2008 | Kling et al. | |
| 2008/0190374 A1 | 8/2008 | Farris et al. | |
| 2008/0257272 A1 | 10/2008 | Bolda et al. | |
| 2008/0264963 A1 * | 10/2008 | Teodorescu | G07F 11/44 221/4 |
| 2010/0030366 A1 | 2/2010 | Scherer et al. | |
| 2010/0089329 A1 | 4/2010 | Lefferson | |
| 2010/0132629 A1 | 6/2010 | Jalbert et al. | |
| 2010/0147760 A1 | 6/2010 | Leavitt et al. | |
| 2011/0017141 A1 | 1/2011 | Hewson et al. | |
| 2011/0067638 A1 | 3/2011 | Lipscomb et al. | |
| 2011/0139076 A1 | 6/2011 | Pu et al. | |
| 2011/0259273 A1 | 10/2011 | Lipscomb et al. | |
| 2011/0265726 A1 * | 11/2011 | Banuelos | A01K 5/0208 119/51.11 |
| 2011/0297090 A1 | 12/2011 | Chamberlain | |
| 2011/0297091 A1 | 12/2011 | Chamberlain et al. | |
| 2012/0006282 A1 | 1/2012 | Kates | |
| 2012/0017839 A1 | 1/2012 | Veness et al. | |
| 2012/0137979 A1 | 6/2012 | Lipscomb et al. | |
| 2012/0216751 A1 | 8/2012 | Rowe et al. | |
| 2012/0325156 A1 * | 12/2012 | Abramson | A01K 5/0283 119/51.01 |
| 2013/0013104 A1 * | 1/2013 | Carelli | A01K 5/0114 700/232 |
| 2013/0019809 A1 | 1/2013 | Mccallum et al. | |
| 2013/0036981 A1 | 2/2013 | Lipscomb et al. | |
| 2013/0087102 A1 | 4/2013 | Lipscomb et al. | |
| 2013/0174790 A1 | 7/2013 | Lipscomb et al. | |
| 2013/0180458 A1 | 7/2013 | Lipscomb et al. | |
| 2013/0199454 A1 | 8/2013 | Lipscomb et al. | |
| 2013/0228508 A1 | 9/2013 | Lipscomb et al. | |
| 2014/0069341 A1 | 3/2014 | Lipscomb et al. | |
| 2014/0090601 A1 | 4/2014 | Stone | |
| 2014/0158209 A1 | 6/2014 | Schiller et al. | |
| 2014/0251223 A1 | 9/2014 | Rowe et al. | |

(56) References Cited

U.S. PATENT DOCUMENTS

| | | | |
|---|---|---|---|
| 2014/0263423 A1 | 9/2014 | Akdogan et al. | |
| 2017/0130432 A1 | 5/2017 | Searcy et al. | |

FOREIGN PATENT DOCUMENTS

| | | |
|---|---|---|
| CA | 1325561 C | 12/1993 |
| CN | 201234507 Y | 5/2009 |
| CN | 202232489 U | 5/2012 |
| CN | 202285810 U | 7/2012 |
| CN | 202310841 U | 7/2012 |
| CN | 202551860 U | 11/2012 |
| CN | 203985484 U | 12/2014 |
| EP | 0610171 A2 | 8/1994 |
| EP | 0636312 A1 | 2/1995 |
| EP | 1145627 A2 | 10/2001 |
| EP | 1300074 A2 | 4/2003 |
| EP | 1360895 A2 | 11/2003 |
| GB | 2454658 A | 5/2009 |
| JP | H0736686 | 7/1995 |
| JP | 2599615 Y2 | 9/1999 |
| KR | 2011/0115696 | 10/2011 |
| KR | 10-2011-0115696 | 3/2012 |
| KR | 101127936 B1 | 3/2012 |
| WO | WO 2003/015003 | 2/2003 |

OTHER PUBLICATIONS

Gate Feeder available through gatefeeder.com (accessed Apr. 6, 2015).

Perfect Petfeeder available through perfectpetfeeder.com/ (accessed Apr. 6, 2015).

Super Feeder available through super-feeder.com (accessed Apr. 6, 2015).

Lusmo Automatic Pet Feeder available through lusmo.com (accessed Apr. 6, 2015).

Watch Automatic Pet Feeder available through Amazon.com (accessed Apr. 6, 2015).

MOTA Perfect Pet Dinner Automatic Food Feeder available through Walmart.com (accessed Apr. 6, 2015).

Petmate Infinity 5 lb Portion Control Automatic Dog Cat Feeder available through Amazon.com (accessed Apr. 6, 2015).

Ergo Auto Pet Feeder available through Amazon.com (accessed Apr. 6, 2015).

Petwant Automatic Pet Feeder available through Amazon.com (accessed Jun. 27, 2014).

Aspen Automatic Pet Feeder available through Amazon.com (accessed Jun. 27, 2014).

Animal Planet Pet Feeder available through Amazon.com (accessed Jun. 27, 2014).

Crestuff Automatic Portion Control Pet Feeder available through Amazon.com (accessed Jun. 27, 2014).

PetSafe Pet Feeder available through Amazon.com (accessed Jun. 27, 2014).

Written Opinion of the International Searching Authority dated Apr. 29, 2015.

Notification of Receipt of Search Copy mailed by ISA dated Feb. 9, 2015.

International Search Report dated Jan. 2015.

CIPO Office Action dated Jun. 13, 2017 for CA Application No. 2911406.

SIPO Office Action dated Jan. 16, 2017 for on Application No. 2014800355223.

EPO Extended Search Report dated Jun. 21, 2017 for EP Application No. 14854865.4.

Certificate of Patent Grant from the Australia IP Office for reciprocal corresponding patent.

Australia IP Office, dated Dec. 9, 2016.

Auto Pet Feeder Available through www.autopet-feeder.com, accessed on Apr. 24, 2015 and Dec. 26, 2015, 4 pages.

Gatefeeder Smart Pet Feeder available through http://gatefeeder.com/, accessed on Apr. 20, 2014 and Dec. 26, 2015, 4 pages.

International Preliminary Report on Patentability for Application No. PCT/US2014/043059 dated Dec. 22, 2015, 11 pages.

Lusmo Automatic Pet Feeder available through www.lusmo.com, accessed on Apr. 20, 2014 and Dec. 26, 2015, 8 pages.

MOTA Automatic Pet Feeder available through www.mota.com, accessed on Apr. 24, 2015 and Dec. 26, 2015, 4 pages.

Partial Supplementary European Search Report for European Application No. 14854865.4 dated Feb. 3, 2017, 7 pages.

Perfect Pet Feeder available through www.perfectpetfeeder.com, accessed on Apr. 20, 2014 and Dec. 26, 2015, 10 pages.

Pet mate Infinity Portion Control Pet Feeder available www.amazon.com/Petmate-Infinity-Portion, accessed on Apr. 24, 2015, 2 pages.

Pet Watch Automatic Pet Feeder available through www.amazon.com/watchautomatic-feeder, accessed on Apr. 24, 2015, 5 pages.

PetNet Automatic Pet Feeder available through www.petnet.io/, accessed on Apr. 20, 2014 and Dec. 26, 2015, 8 pages.

Super-Feeder Programmable Pet Feeder available through www.super-feeder.com, accessed on Apr. 20, 2014 and Dec. 26, 2015, 9 pages.

Co-pending Design U.S. Appl. No. 29/448,927, filed Mar. 14, 2013, 3 pages.

Co-pending Design U.S. Appl. No. 29/449,001, filed Mar. 14, 2013, 3 pages.

ETSY website from Ceramic Pet Bowl Artist printed Mar. 26, 2013, 2 pages.

Extended European Search Report for European Application No. 17176845.0 dated Oct. 9, 2017, 8 pages.

Gizmag, Furbo lets you dispense dog treats from afar, http://www.gizmag.com/furbo-pet-treat-camera/43038/, accessed on Jun. 24, 2016, 3 pages.

INDIEGOGO, https://www.indiegogo.com/projects/furbo-world-s-best-treat-tossing-dog-camera#/, accessed on Jun. 24, 2016, 3 pages.

KDF Process Media published by Fluid Treatment, Inc., Apr. 2003, 8 pages.

Non-Final Office Action dated Dec. 9, 2013 for U.S. Appl. No. 13/345,261, filed Jan. 6, 2012, 12 pages.

International Search Report and Written Opinion for Application No. PCT/US2018/34101 dated Aug. 24, 2018, 11 pages.

* cited by examiner

AUTOMATIC ANIMAL FEEDING SYSTEM

CROSS REFERENCE TO RELATED APPLICATIONS

This application claims the benefit of U.S. Ser. No. 61/836,711 filed Jun. 19, 2013. That application was entitled "Networked Automatic Animal Feeding Device." The provisional application is referred to and incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present inventive concept relates to the field of animal feeding devices. More particularly, the invention relates to animal feeding devices wherein the dispensing of food for the pet may be programmed. The invention further relates to pet feeding devices wherein the dispensing of food may be timed and controlled remotely.

Technology in the Field of the Invention

Many animal owners have a need to feed their animals on an automated basis. The need typically arises when the owner is absent and is unable to feed a pet at the appropriate times due to work obligations or travel. In other instances, the owner has a physical limitation that inhibits them from periodically filling a food bowl. In these instances, an automatic pet food dispenser can provide food to the pet over time.

Pet feeders have been developed that incrementally deliver dry food to an animal through the force of gravity. One example is U.S. Pat. No. 6,467,428, entitled "Filtered Water and Feeding System for Pets." The '428 patent discloses a system that includes both a gravity watering unit (for dispensing filtered water) and a gravity feeding unit (for dispensing pet food). Each unit resides over a dispensing bowl. The bowl receives and supports the respective dispensing unit such that the stored water or food passes through the opening, under the force of gravity, and into the corresponding bowl. The bowl presents the food or water such that it is accessible to an animal. As the animal consumes the food or water from the bowl, gravity forces more food or water through the opening and into the bowl.

An improved gravitational feeding device was disclosed in U.S. Pat. No. 8,387,566 entitled "Gravity-Induced Automatic Animal Watering/Feeding Device." The device includes a reservoir that houses food, and a base member that supports the reservoir. The device further includes a receptacle received by the base member to receive the food when it passes from the reservoir. A reservoir cap is also provided. The reservoir cap is removably secured to a reservoir opening and includes a valve disposed at the water outlet. The valve is movable between a first position that allows food or water to flow from the reservoir to the receptacle by way of an outlet when the reservoir is supported by the base member, and a second position that prevents the food or water from flowing from the reservoir when the reservoir is removed from the base member. Thus, the device minimizes the amount of food or water that is spilled when the reservoir is being refilled.

Of interest, the receptacle is removable from the bowl for easy cleaning. This promotes sanitation. In addition, the reservoir is secured to the bowl through a twist-and-lock arrangement, which further prevents spilling in the event the device is overturned.

U.S. Pat. No. 6,401,657 is entitled "Automatic Pet Food Feeder." This patent teaches a motorized feeder. The feeder has a vertically-positioned "storage bin" having an open bottom. The storage bin generally sits above but offset from a bowl. The feeder also has "a motor mounted to the housing and having a rotatable shaft," and "an auger . . . mounted to the rotatable shaft of the motor." The auger resides within an elongated tube. Actuation of the motor by a timing device or a sensing device causes the auger to turn, which in turn drives food horizontally along the tube and into the bowl. Thus, the feeder provides for horizontal drive-screw feeding.

As noted, a timer may be used to control a motor which drives a screw feeder, such as the feeder of the '657 patent. In this way, food is dispensed in limited quantities at different times. In another example, the pet feeder has either a rotatable cover or a rotatable bowl. Relative rotation exposes different parts of the bowl to the pet as rotation takes place. An example of such a product is the PetSafe® Automatic Feeder provided by Radio Systems Corporation of Knoxville, Tenn. Covering portions of the bowl prevents the pet, such as a puppy, from over-eating or from eating all of the food in the bowl in one or two feedings. Further, the timer ensures that the pet will have food at a certain time even though the owner may be absent. In some instances, access to food is denied after a certain period of time through relative rotation of the cover and a compartment of the bowl.

Another feeder available on the market is the PetMate Infinity™ Pet Feeder. "PetMate" is a trade name of Doskocil Manufacturing Company, Inc. from Arlington, Tex. This feeder uses either a mechanical auger or a paddle wheel system to agitate food from a pet storage container, and dispense food in a dish in limited quantities. This ensures portion control. Further, some of the PetMate™ products are programmable in terms of timing for dispensing food.

Despite these products and their benefits, any of the gravitational, auger-driven or paddle-wheel systems can be inconsistent in terms of how much food is dispensed. It is noted that dry pet food frequently isn't really that dry. In many instances, pet food includes kibbles that are moist and, thus, can stick together or come out in small clumps. This can cause the pet food dispenser to jam. In some instances, moist kibble pieces can stick to mechanical parts of a dispenser. As the Archimedes' screw or the paddle wheel attempts to shear food and move it forward, the feeding device can again become jammed. At a minimum, the shearing action leads to increased stress on components.

Another design short coming in some incremental pet feeders is that the clever pet, with their paw, can reach up into the opening from where the food is dispensed and cause more food to fall out. Therefore, an automatic food dispenser offering controlled feeding wherein the pet cannot reach in and remove food itself is needed. Further, a food dispenser offering programming and remote control with a reduced likelihood of jamming is needed.

BRIEF SUMMARY OF THE INVENTION

An animal feeding system is provided herein. In one embodiment, the animal feeding system first includes a housing. The housing serves to at least partially conceal certain mechanized components of the system.

The animal feeding system also includes a container. The container is dimensioned to hold dry pet food in pellet form. The container has an upper end and a lower end. The upper end may include a lid for receiving and then covering pet food. The lower end has an opening through which the pet food gravitationally travels. Preferably, the lower end is frusto-conical in shape, or is otherwise angled to facilitate gravitational movement of the pet food. Preferably, the container rests over and is at least partially supported by the housing.

The system also includes a receptacle. The receptacle is dimensioned and positioned to receive the dry pet food as it gravitationally falls through the opening in the container. The receptacle has an open top for receiving the food. Preferably, the receptacle is integral to the housing for the animal feeding system.

The system also provides a conveyor system. The conveyor system moves the dry pet food as it is received by the receptacle. The conveyor system includes a conveyor belt. The conveyor belt may be fabricated from rubber, plastic or other flexible material. The conveyor belt has a plurality of raised ribs that are spaced apart along the belt. The ribs form compartments for holding designated volumes of the dry pet food. Of interest, the conveyor belt is angled upward at least 15 degrees, and preferably at least 30 degrees, relative to horizontal to reduce the risk of jamming.

The conveyor system also includes a drive motor. The drive motor causes cycling of the conveyor. In one aspect, the drive motor is an electric motor that rotates a drive shaft. The drive shaft, in turn, imparts rotational movement to the conveyor. As the conveyor moves according to a designated cycle, it picks up food from the receptacle.

The conveyor system resides within the housing. The housing will have walls that generally enclose the conveyor system and its mechanized components. The wall (or walls) also serve to retain the dry pet food along the conveyor belt and within the housing as the conveyor belt cycles, thereby also forming the compartments.

The animal feeding system further comprises a feeding bowl. The bowl defines an opening for receiving the dry pet food from the conveyor belt. In one aspect, the bowl is integral to and is supported by the housing. Alternatively, the bowl is a conventional bowl that is just placed below an outlet in the housing at the end of the conveyor belt. In this way, the bowl may be easily cleaned or replaced.

Additionally, the animal feeding system includes a processor. The processor is in electrical communication with the motor. The processor is configured to deliver start and stop signals to the motor in response to wireless signals sent from a control unit.

The animal feeding system additionally comprises the user control unit. The control unit offers a user interface for programming the system according to a desired feeding schedule. In one aspect, the user control unit is integral to the housing and provides a user with an LCD panel for programming feeding. In another aspect, the user control unit is a remote control having a transmitter or a transceiver for sending wireless control signals to the processor. In this instance, the remote control may be a dedicated remote control unit, a personal digital assistant, or a general purpose computer that interfaces through a website.

In any of the above aspects, the user may select from any of the following feeding methods:

(a) portion control feeding, wherein a designated amount of food is dispensed into the feeding bowl one or more times per day, such designated amount being less than a full volume of the feeding bowl;

(b) slow-feeding, wherein a designated amount of food is dispensed into the feeding bowl one or more times per day, but with the conveyor belt cycling at a substantially reduced rate;

(c) free choice feeding, wherein a set portion of food is always available to the pet to eat from whenever they desire;

(d) timed feeding, wherein a set portion of food is available to the pet for a certain period of time, and then removed at the end of that set period of time;

(e) treat dispenser feeding, wherein a solid pet treat is dispensed automatically according to a timer, or immediately in response to a signal sent by the user through the remote control unit; and (f) selective access feeding, wherein the animal feeding system is able to distinguish between two or more pets such that a selected pet is unable to access a feeding bowl at certain times.

A method of delivering dry pet food to an animal is also disclosed herein. The method generally includes providing a bowl. The bowl defines a wall and an interior basin for holding a dry, pelletized pet food. The method also includes filling a container with the pet food. The food in the container is positioned to gravitationally fall into a receptacle below the container. The method also includes programming an animal feeding system that periodically activates a conveyor belt for transporting the dry pet food from the receptacle and into the bowl.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 2A is a side view of the conveyor system, with a side wall removed to expose the conveyor belt. A pair of pulleys is seen used for supporting and for turning the conveyor. A mechanical agitator is also visible.

FIG. 2B is a perspective view of the conveyor system of FIG. 2A, with both side walls intact. The conveyor belt includes a series of compartments for holding defined volumes of dry pet food.

FIG. 2C is another perspective view of the conveyor system of FIG. 2B, but shown from a side opposite that of FIG. 2A. No food is in the compartments of the conveyor belt.

FIG. 2D is still another perspective view of the conveyor system of FIG. 2B, but with components shown in exploded-apart relation.

In FIG. 7A, a feeding schedule is shown on the display. In FIG. 7B, a real time status report concerning feeding is shown on the display.

In FIG. 8A, a real time status report concerning feeding is shown on the display, indicating the feeding bowl as full. In FIG. 8B, a real time status report concerning feeding is shown on the display, indicating that a pet has approached the feeding bowl.

In FIG. 9A, a new feeding schedule is shown on the display, showing a timed feeding. In FIG. 9B, a real time status report concerning feeding is shown on the display, indicating that food has been dispensed. In FIG. 9C, a real time status report concerning feeding is shown on the display, indicating that the feeding bowl has been emptied.

In FIG. 10A, a new feeding schedule is shown. In FIG. 10B, a real time status report concerning feeding is shown, indicating that the pet has received a treat.

DETAILED DESCRIPTION OF CERTAIN EMBODIMENTS

Definitions

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the term "pellet" means a substantially dry, granular piece of food, of any shape, that may be consumed by a canine or feline or other similar household pet. The term "pellet" includes semi-moist kibbles.

Description of Selected Specific Embodiments

Figure 1A:
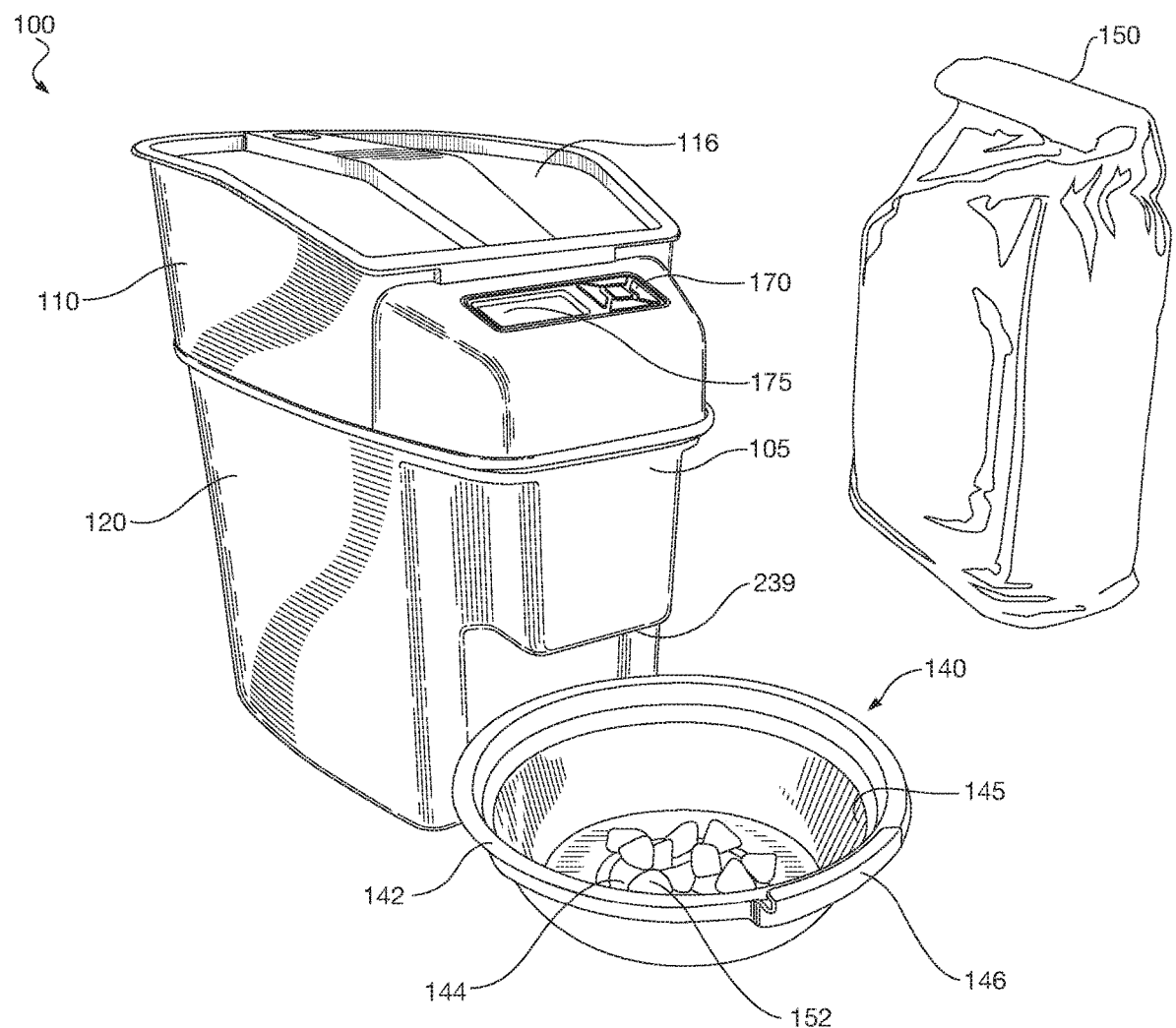
FIG. 1A is a perspective view of an animal feeding system of the present invention, in one embodiment. The feeding system includes a container for holding dry pet food, and a processor for controlling how food is dispensed into a bowl in response to programming.

FIG. 1A is a perspective view of an animal feeding system 100 of the present invention, in one embodiment. The feeding system 100 is shown as an integral unit. The feeding system 100 generally includes a container 110 for holding dry pet food, and a housing 105 for holding internal components.

The container 110 removably resides on top of the housing 105. The container 110 may be a transparent or translucent body having a substantially hollow interior. (The interior is shown at 115 in FIG. 1B.) The interior 115 is dimensioned to receive and hold a dry, pelletized pet food. Preferably, the container 110 is fabricated from a lightweight material such as a polycarbonate. Ideally, the container 110 is at least partially supported by the housing 105.

FIG. 1A also shows an illustrative bag of pet food at 150. The bag 150, of course, is not part of the system 100; however, the bag 150 is shown to demonstrate a source for pelletized food (seen in a bowl 140 at 152) that is placed into the container 110. The food may be, for example, dog food.

The animal feeding system 100 of FIG. 1A also shows a feeding bowl 140. The illustrative feeding bowl 140 includes an upper rim 142 and a supporting base 144. The bowl 140 defines an open container 145 for receiving pellets of the dry pet food (seen at 152 in FIG. 1C). The bowl 140 is positioned to gravitationally receive the pet food from a conveyor system (seen at 230 in FIGS. 2A through 2D) that resides and operates within the housing 105.

Figure 1B:
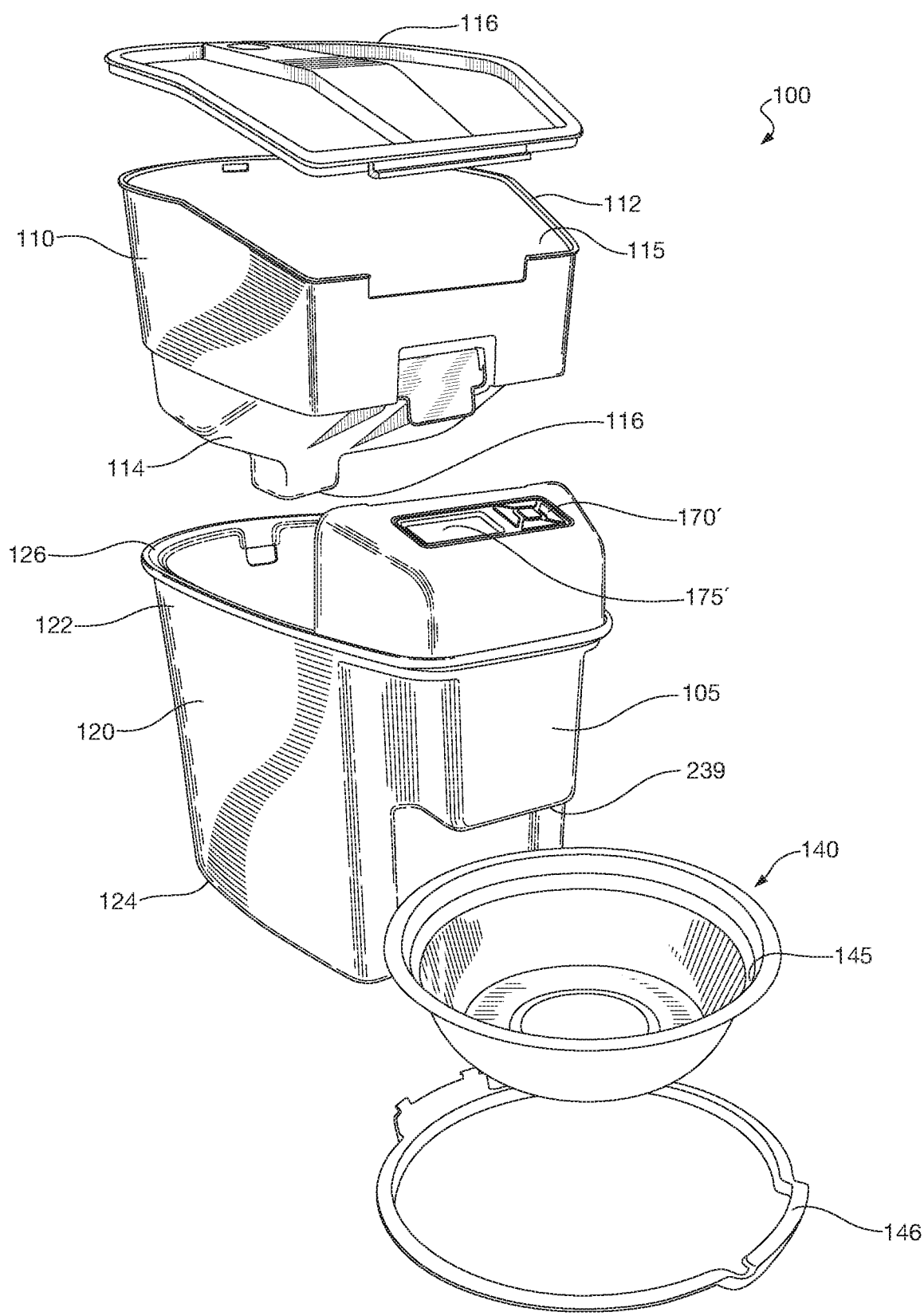
FIG. 1B is another perspective view of the animal feeding system of FIG. 1A, but showing certain components in exploded-apart relation. These components include, for example, the container, a housing and the bowl.

FIG. 1B is another perspective view of the animal feeding system 100 of FIG. 1A. In FIG. 1B, certain parts of the system 100 are shown in exploded apart relation. These components include the container 110, the housing 105 and the bowl 140. A bracket 146 for supporting the bowl 140 is also shown. Of interest, the container 110 includes an upper end 112 for receiving the lid 116, and a lower end 114. The lower end 114 of the container 110 has a funneled (or frusto-conical) opening 116 through which dog feed gravitationally travels.

Figure 1C:
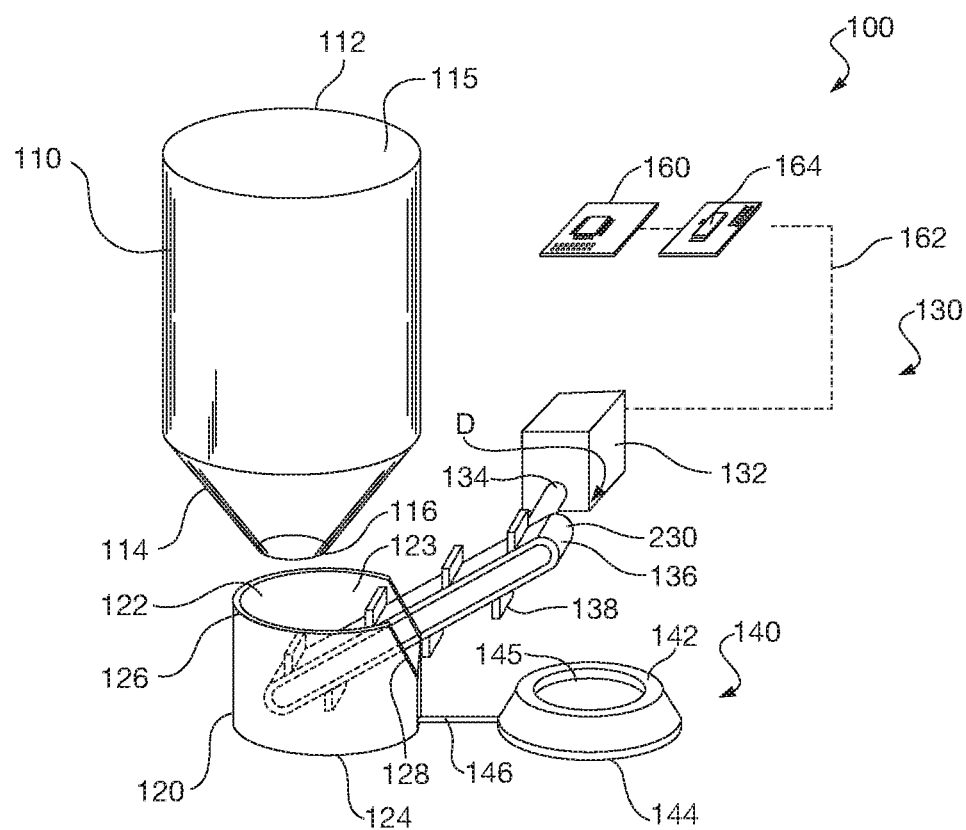
FIG. 1C is another perspective view of the animal feeding system of FIG. 1A in a modified embodiment. Here, the housing has been removed to expose a conveyor system and a drive motor. The system includes a micro-processor that is in electrical communication with a separate user control.

FIG. 1C is another perspective view of the animal feeding system 100 of FIG. 1A, in a modified embodiment. In this view, the housing 105 has been removed to expose a conveyor belt 230. The conveyor belt 230 is broken up into compartments (shown at 235 in FIG. 2B), and is cycled by a drive motor 130 that is operated by a controller. The controller is preferably a micro-processor 160, which in turn is in wired electrical communication with a separate user control (seen in FIG. 1D at 170"). It is understood that the controller 160 may operate through hardware, firmware, software, or some combination thereof.

FIG. 1C also provides a perspective view of the container 110 but in an alternate geometry. As shown, the container 110 has a top end 112 and a lower end 114. The lower end 114 has an angled surface to facilitate gravitational movement of the pet food. A bottom portion of the lower end 114 includes an opening 116 for delivering the dry pet food 152 (shown in FIG. 1A) from the angled surface.

The pet food is gravitationally dispensed from the container 110, through the opening 116, and into a receptacle 120. In the illustrative arrangement of FIG. 1C, the receptacle 120 is a cylindrical body having an open top end 122 and a closed bottom end 124. Preferably, the open top end 122 defines a lip 126 fabricated from an elastomeric or plastic material for receiving and supporting the container 110.

In the arrangement of FIG. 1C, the receptacle 120 is shown as an independent body. The receptacle 120 includes an open wall portion 128. The open wall portion 128 is dimensioned to accommodate the conveyor belt 230. In a more preferred embodiment, and as shown in FIG. 1A, the receptacle 120 is integral to the housing 105 and forms a catch basin below the lower end 114 of the container 110 for catching the pet food.

The conveyor belt 230 is part of a conveyor system 200. The conveyor system 200 is configured to move pellets of pet food according to timed cycles. To do this, the conveyor system 200 works in conjunction with the drive motor 130. The motor 130 is an electric motor that resides within a suitable housing 132. Preferably, the housing 132 is fabricated from a durable, water resistant material such as metal or plastic. The motor 130 may be battery operated, but may alternatively operate under line power (electrical cord not shown). The motor 130 may have an external on/off switch, but alternatively is controlled through a digital, wireless control unit.

When activated, the drive motor 130 turns a drive shaft 134. The drive shaft 134, in turn, rotates a conveyor shaft (shown at 232 in FIG. 2B) and connected drive pulley (shown at 234 in FIG. 2B). Rotation of the conveyor shaft 232 is indicated in FIG. 2B at Arrow "D." The mechanical interface between the drive shaft 134 and the conveyor shaft 232 may be by means of a gear. Turning of the conveyor shaft 232 causes the conveyor belt 230 to be actuated. In this way, the conveyor belt 230 is rotated by the electric motor 130 to pick up volumes of the dry pet food from the receptacle 120.

A user control unit is shown in FIG. 1B at 170'. This represents a control unit that is integral to the housing 105. The control unit 170' preferably includes an LCD display 175'. As an alternative, or in addition, a remote user control unit may be employed. An example is again shown at 170" in FIG. 1D.

Figure 1D:
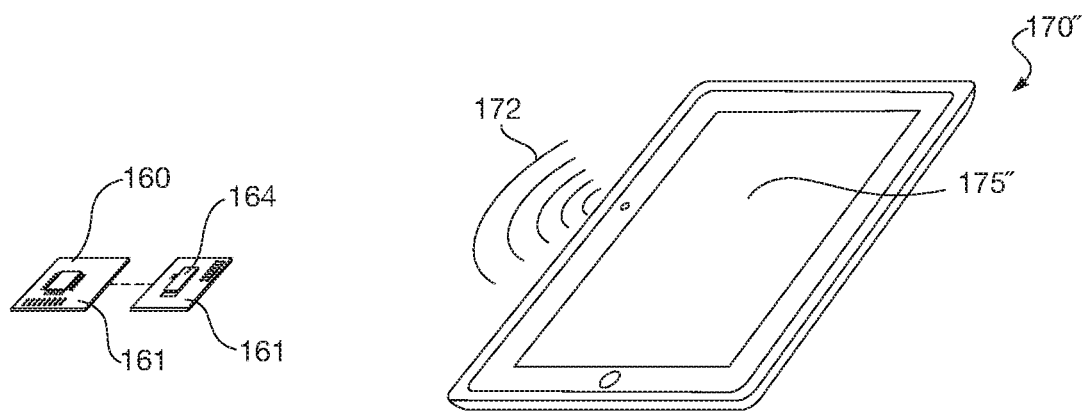
FIG. 1D is an enlarged view of a micro-processor from the animal feeding system of FIG. 1C. The micro-processor is in wireless electrical communication with a separate remote control in the form of a portable digital assistant.

FIG. 1D provides an enlarged schematic view of the micro-processor 160 from the animal feeding system 100 of FIG. 1A. The micro-processor 160 resides on a printed circuit board 161. The micro-processor 160 is in wireless electrical communication with a control unit 170" by means of an associated receiver (or transceiver) 164 The control unit 170" defines a micro-processor and a transmitter (or transceiver), and enables the user to program and remotely control feeding cycles and options for the feeding system 100.

Food delivery instructions are delivered by the user to the system 100 using wireless signals 172. The control unit 170" includes a display 175". The display 175" ideally allows for a touch-screen user interface. Preferably, the control unit 170" represents a so-called tablet that communicates with the transceiver 164 associated with the micro-processor 160 through Blue-Tooth, IR, Zigbee, WiFi, a telecommunications network, or other protocol. Alternatively, the control unit 170" may be a general purpose computer that communicates with the transceiver 164 associated with the micro-processor 160 through a telecommunications network. Alternatively still, the control unit 170" may be a dedicated remote control that operates in proximity to the system 100 through the use of IR signals.

As noted, the feeding system 100 also includes a feeding bowl 140. The bowl may be fabricated from any material that is easily cleaned such as stainless steel, plastic, ceramic or even glass. The illustrative feeding bowl 140 includes an upper rim 142 and a supporting base 144. The bowl 140 defines an open container 145 for receiving the pellets 152 of dry pet food. The bowl 140 is positioned to gravitationally receive the pet food from the conveyor belt 230 as the conveyor belt 230 is rotated by the drive shaft 132 in accordance with programming instructions.

In the arrangement of FIG. 1C, the bowl 140 is spaced-apart from the receptacle 120 and held in proper position by a bar 146 or other support means. The bar 146 prevents the container 145 from shifting during feeding, causing the conveyor belt 230 to "miss" the bowl 140 during dispensing. Alternatively, and as shown in FIG. 1B, the bowl 140 is an independent container 145 that may be freely removed for cleaning.

FIGS. 2A through 2D provide enlarged views of the conveyor system 200 of the animal feeding system of FIGS. 1A and 1C.

Figure 2A:
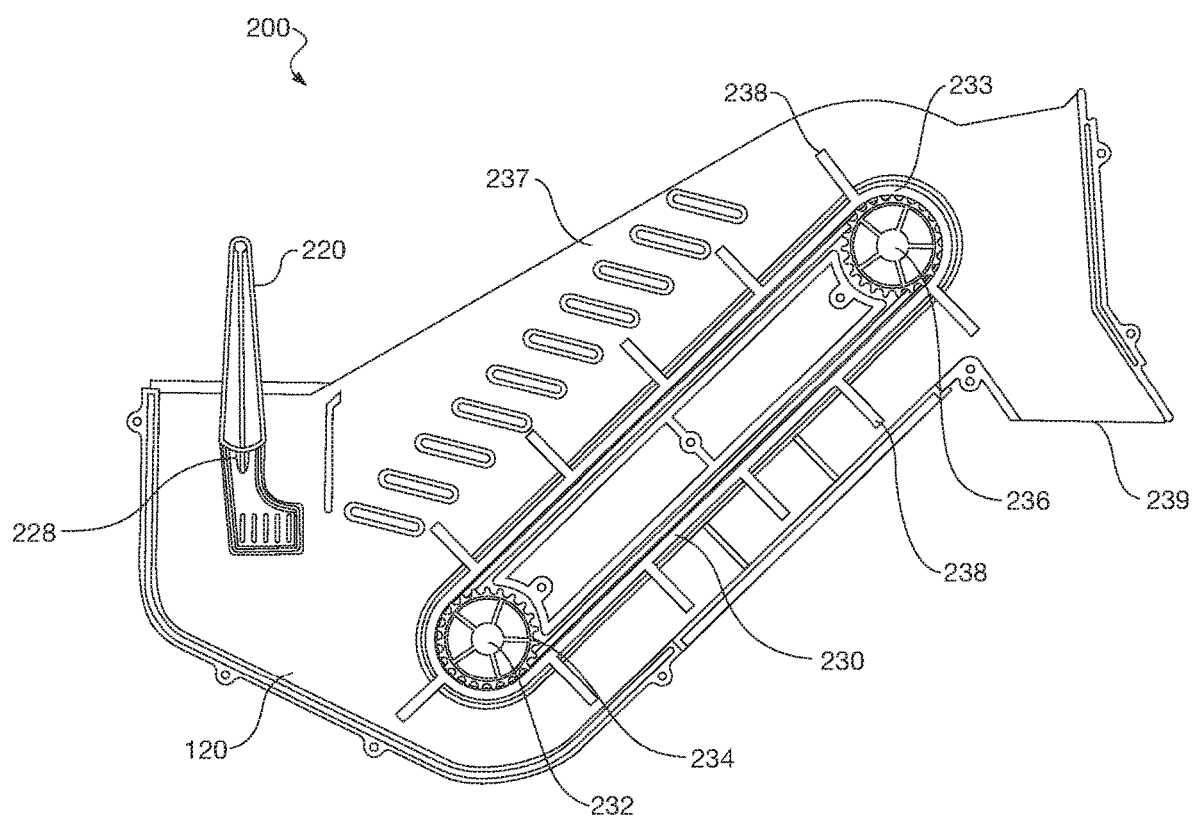
FIGS. 2A through 2D provide views of components of a conveyor system to be used in the animal feeding system of FIG. 1A. The conveyor system includes a compartmentalized conveyor belt.
Figure 2B:
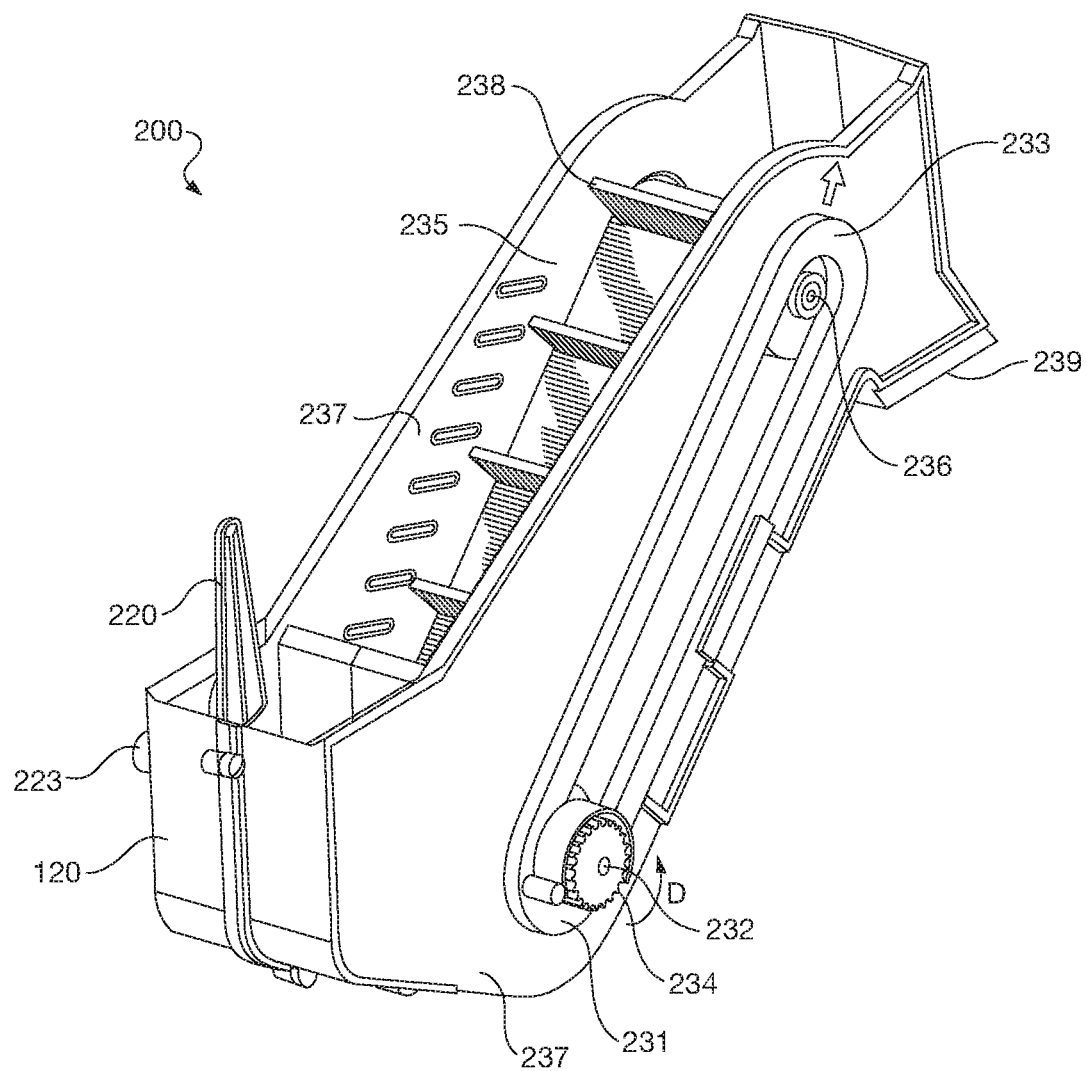

First, FIG. 2A provides a side view of the conveyor belt 230. One of the side walls 237 has been removed to expose the conveyor belt 230 for illustration. FIG. 2B is a perspective view of the conveyor belt 230 of FIG. 2A, with both side walls 237 intact. From FIG. 2B it can be seen that the conveyor belt 230 includes a series of compartments 235 for holding defined volumes of dry pet food. The walls 237 help to define the compartments 235.

Figure 2C:
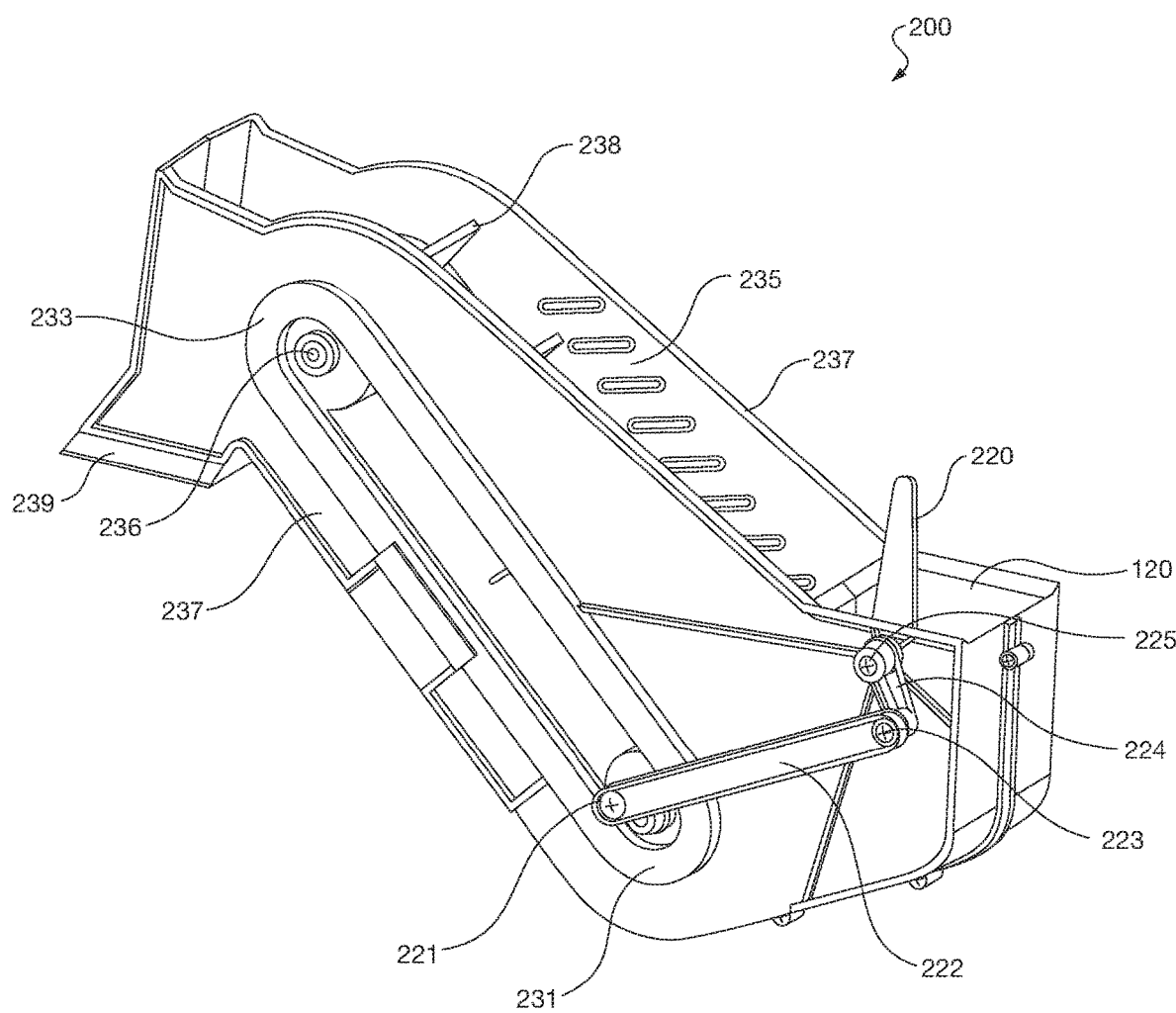
Figure 2D:
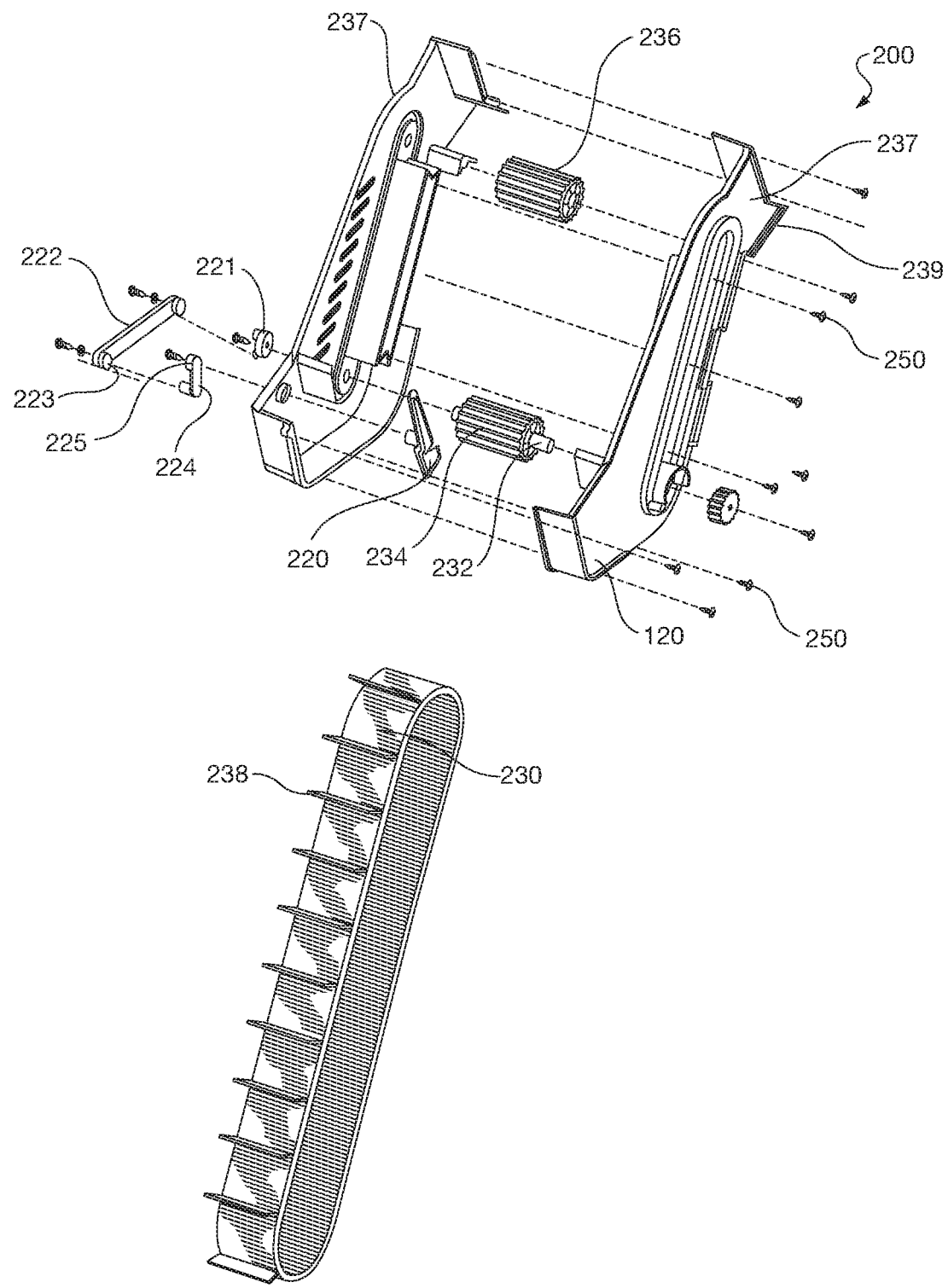

FIG. 2C is another perspective view of at least a portion of the conveyor system 200. Here, the conveyor system 200 is shown from a side opposite that of FIG. 2A. No food is seen in the conveyor belt 230. FIG. 2D is another perspective view of portions of the conveyor system 200, but with components shown in exploded-apart relation. Multiple threaded connectors 250 are seen, also exploded apart. The conveyor system 200 will be discussed with reference to FIGS. 2A through 2D, together.

As noted, the conveyor system 200 first includes a conveyor belt 230. The conveyor belt 230 is fabricated from a durable and flexible material, such as rubber, synthetic rubber, plastic, or combinations thereof. Preferably, the conveyor is fabricated from a material that can be easily wiped or suctioned for removing food particles.

The conveyor belt 230 may be about 1.5 to 3.0 inches in width, and 1/16-inch to 1/8-inch in thickness. The conveyor belt 230 may be one long, continuous seam of material; alternatively, the conveyor belt 230 may be assembled by linking two or three or more lengths of material together, end-to-end, to form a continuous loop.

The conveyor belt 230 has opposing first 231 and second 233 ends. The drive pulley 234 resides at the first end 231, which is the lower end, while an idle pulley 236 resides at the second opposing end 233, which is the upper end. The conveyor belt 230 rotates or cycles about the two pulleys 234, 236.

The drive motor 134 is in electrical communication with the micro-processor 160. This is preferably done through a wire 162 associated with the printed circuit board 161 residing within a same housing 132 as the electric motor 130, or otherwise residing within housing 105. The micro-processor 160 interfaces with a transceiver 164 that receives wireless signals from the control unit 170' and/or 170". The transceiver 164 will include an antenna (not separately shown) to radiate or receive radio waves or other wireless signals.

In operation, the drive motor 130 rotates the drive shaft 132 according to a designated speed. The speed may optionally be determined by the pet owner during programming using the control unit 170". As described more fully below, some larger dogs tend to gulp their food, creating health issues for the animal. For these owners, a "slow-feed" setting, or mode, may be selected that causes food to be dispensed from a conveyor end (seen in FIG. 1B at 239) much more slowly.

In any mode, the drive shaft 132 is mechanically engaged with and rotates the conveyor shaft 232. The conveyor shaft 232 resides within and rotates the drive pulley 234. The drive pulley 234 is mechanically connected to and turns the conveyor belt 230 at the first end 231. In this way, the conveyor belt 230 is rotated by the electric motor 130 and drive shaft 132 to pick up volumes of the dry pet food.

Of interest, the conveyor belt 230 includes a series of cleats, or raised ribs 238. In one aspect, the ribs 238 are spaced apart in 2-inch segments. Alternatively, the ribs 238 are spaced apart in 2.5-inch segments, or 3-inch segments. The ribs 238 are preferably about 0.75 to 2.5 inches in height. In this way, a volume between about 2.25 $in^3$ to 22.5 $in^3$ is provided for individual compartments 235.

The ribs 238 aid in the transporting of pet food 152 along the conveyor belt 230. Ideally, the ribs 238 are equi-distantly spaced apart in such a manner as to create designed volumes within compartments 235. For example, a volume between ribs 238 may be 1/8th of a cup (1.8 $in^3$), or 1/4th of a cup (3.6 $in^3$), or 1/2 of a cup (7.2 $in^3$). Rotation of the conveyor belt 230 is timed so that the conveyor belt 230 is advanced to deliver one 1/8th of a cup, or two 1/8th of a cup (i.e., 1/4th of a cup), for example. Those of ordinary skill in the art will understand that the amount of food that is delivered in one cycle is a function of the length of time in which the motor 130 turns the drive shaft 132, and the volume of the compartments 235.

In one aspect, the user selects the slow-feed mode. This causes the drive shaft 132 to turn very slowly, such as 1.0 Hz, or 1.5 Hz, and over a period of time that is 30 seconds, or 40 seconds, for example. The result is that 1/8th of a cup of food is delivered over the 30 second, or the 40 second, time period. This forces the animal waiting for food to be delivered to eat slowly.

As noted, opposing walls 237 are provided along the conveyor belt 230. The walls 237 hold the pet food 150 between the raised ribs 138, thereby providing the compartments 235 described above. The walls 237 terminate at a chute 239. The chute 239 defines an exit opening, such that the pet food may be dropped from the chute 239 and into the food bowl 140 as the conveyor belt 230 is cycled. The chute 239 is located at the end 136 of the conveyor belt 230.

Cycling of the conveyor belt 230 causes pellets of the dry pet food (shown at 152 in FIG. 1A) to move from the receptacle 120, along the conveyor belt 230, and into a separate feeding bowl 140. More specifically, pellets of food 152 are dropped from the chute 239 and into an opening (or open top) 145 in the bowl 140.

The conveyor belt 230 shown in FIGS. 2A through 2D is set at about a 50° angle. It is desirable to use at least a 15 degree angle, and more preferably at least a 20° angle, a 30° angle, or even a 45° angle relative to horizontal to provide clearance for the chute 239 above the bowl 140.

In one aspect, the conveyor system 200 includes a brush above the conveyor belt 230 at the lower end 231. The brush is not shown in the drawings, but it is understood that the brush would maintain an even top level between the raised ribs 238. The brush would push excess food 152, or kibbles back towards a next compartment 235, thus helping to keep compartment volumes consistent.

To further aid in moving pellets 152 from the container 110 to the receptacle 120, an optional agitator 220 may be provided. The agitator 220 is seen in FIGS. 2A through 2C. In one embodiment, the agitator 220 defines an elongated tooth that extends upward from the receptacle 120 and into the lower opening 116 of the container 110. The agitator 220 reciprocates in order to move and dislodge pellets 152 at the base 114 of the container 114.

As shown best in FIG. 2C, the agitator 220 is reciprocated through a series of pivot connections 221, 223, 225. First, a pin resides along the conveyor shaft 232. This pin serves as a first pivot connection 221. A pair of arms 222, 224 resides intermediate the first pivot connection 221 and the agitator 220. The two arms 222, 224 are connected by means of a pin which serves as the second pivot connection 223. Finally, a third pin connects a distal end of the second arm 224 to a base 228 of the agitator 220. This pin serves as the third pivot connection 225.

As the conveyor shaft 232 rotates, the first pivot connection 221 is rotated. This causes a proximate end of the first arm 222 to rotate at the drive pulley 234. Movement of the proximate end of the first arm 222, in turn, imparts rotation of the pin at the second pivot connection 223. This rotational movement produces reciprocation in a proximate end of the second arm 224 at the second pivot connection 223. As one of ordinary skill in the art will understand, this, in turn, imparts a rotational movement at the third pivot connection 225.

In operation, the volume of food 150 that is dispensed by the conveyor system 200 is correlated to time. Thus, the system 200 is designed so that, for example, operation of the motor 130 for 5 seconds produces two, ⅛th cup compartments 225 of food 150. In another aspect, a volume of pellets 152 dispensed is determined by tracking the number of raised ribs 138 that have passed by or across a visual or IR sensor. In either instance, the use of the conveyor system 200 with a conveyor belt 230 having compartments 225 between raised ribs 238 provides the user or pet owner with the ability to select different feeding methods and feeding times for their pet.

In accordance with embodiments disclosed here, feeding may be free-choice, wherein a bowl is filled once or twice a day, as needed by the user. In this instance, the conveyor belt 230 may be rotated a sufficient amount of time to substantially fill the feeding bowl 140. This may occur, for example, once in the morning and once in the evening as set by the pet owner using a digital timer. Alternatively, feeding may be incremental, thereby providing portion control. In this instance, a limited portion of food 150 is delivered by rotating the conveyor belt 230 for a shorter duration, but in, for example, two or four hour increments. This prevents the pet from eating too much food in one feeding.

In the animal feeding systems 100 of FIGS. 1A and 1C, a system is provided for accurately feeding a pet in controlled amounts and at controlled times. The system 100 is shown in the context of dry pellets 152. The pellets 152 gravitationally move from the container 110, down into the receptacle 120, and then along the conveyor belt 230. The pellets 152 are conveyed or moved to the chute 239 and then dropped into the feeding bowl 140 in response to rotational movement of the conveyor drive shaft 232, moving the drive pulley 234.

Different embodiments of the animal feeding system 100 may be provided.

Figure 3:
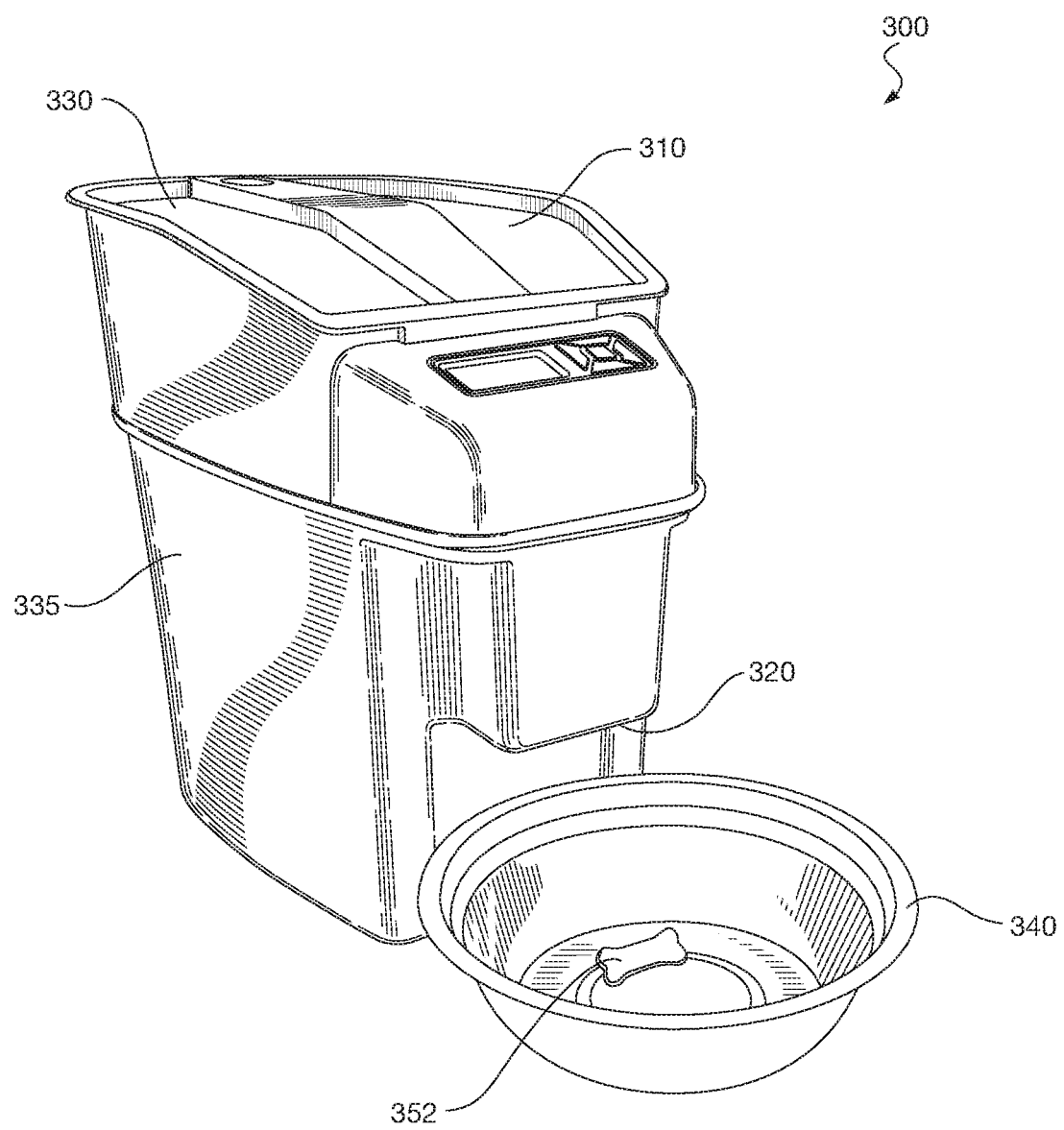
FIG. 3 is a perspective view of an animal feeding system. In this arrangement, separate compartments are provided for dry pet food and for pet treats.

First, FIG. 3 provides a perspective view a pet feeding system 300 that uses two separate containers —container 310 that holds dry pet food, and container 330 that holds solid treats. The pet feeding system 300 is shown with certain parts in exploded-apart relation so that containers 310 and 330 may be viewed.

The container 310 gravitationally releases dry pet food to a receptacle 320, while solid treats are gravitationally (or otherwise) dispensed from the container 330 to a treat receptacle 335. Both the food and the treats are ultimately dispensed into a bowl 340 using a conveyor system in accordance with system 200. Alternatively, treats may move down an angled surface and directly through the chute 239 by opening a small valve (not shown) or by turning a drive-screw (not shown). An illustrative pet treat is shown at 352 within the bowl 340.

Figure 4:
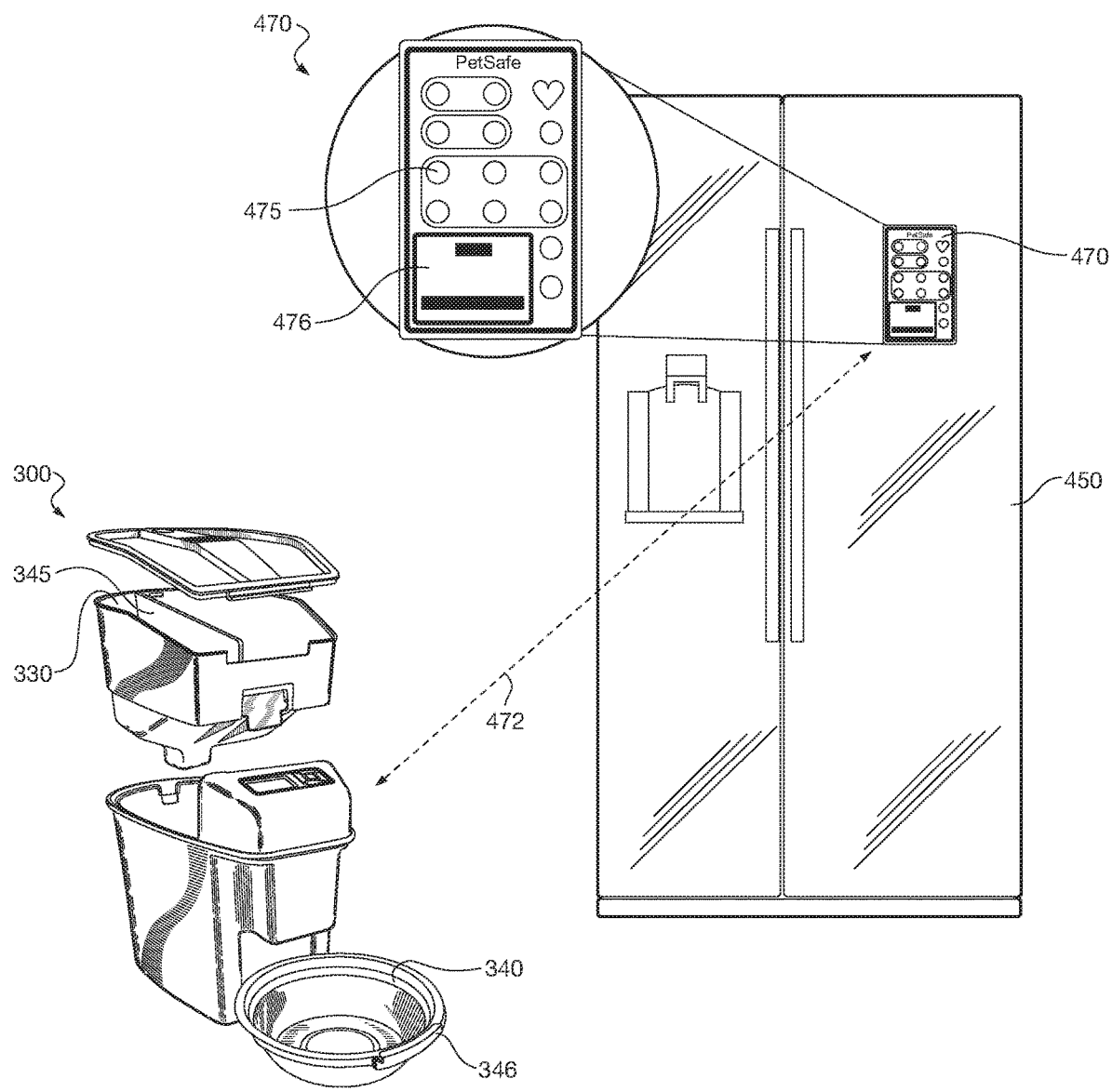
FIG. 4 illustrates the animal feeding system of FIG. 3 in operative relation to a remotely located user control unit. The control unit is configured to magnetically and removably reside on the door of a refrigerator, and is used for controlling or programming the animal feeding system, in one embodiment. Certain components of the feeding system are shown in exploded-apart relation.

FIG. 4 is a general view of the animal feeding system 300, wherein the system 300 is residing in a user's kitchen. A wall 345 is shown, separating the food container 310 from the treat container 330. It is noted, however, that the use of a container 330 and dispensing system for pet treats 352 is optional and not preferred. Also seen in FIG. 4 is a bracket 346 for supporting the bowl 340 relative to the dispensing system 300.

The system 100 (or 300) may be controlled remotely by using a digitally programmable control unit 470. In one aspect, the user control unit resides on a fixture, such as an appliance, near the animal feeding system 300.

The remote control unit 470 presents various buttons 475 for sending commands and establishing settings for the animal feeding system 300 as the user interface. The remote control unit 470 communicates wirelessly with the microprocessor 160 of the system 300 through an RF, Zigbee, Blue Tooth or Wi-Fi transceiver or other wireless protocol to send wireless signals 472.

The remote control unit 470 is intended to reside close to the animal feeding system 300. In the illustrative arrangement of FIG. 4, the remote control unit 470 is shown residing magnetically on a refrigerator door 450. In this instance, the animal feeding system 400 resides in or near a user's kitchen.

The control unit 470 includes an optional "emotional feed button" 476. This button 476 may be pressed by the user to reward a pet. Pressing button 476 causes a treat to be dispensed from the treat container 330 and into the bowl 340. Alternatively, individual food pellets (seen at 152 in FIG. 1A) may be dispensed from the receptacle 320.

Figure 5:
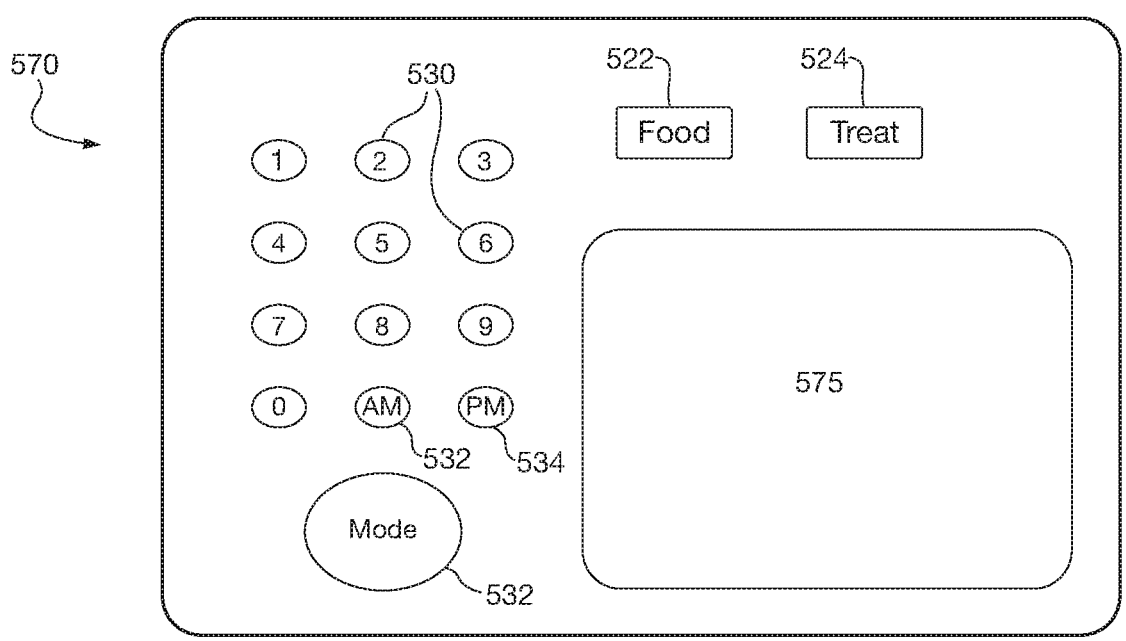
FIG. 5 is an enlarged plan view of a control panel designed to reside on the housing of the animal feeding system, in one embodiment. In this arrangement, the control panel serves as a user control unit.

As an alternative to the remote control unit 470 residing near the animal feeding system 300, the system 300 may have a user interface that resides on the housing 305 of the system 300 itself. FIG. 5 is a perspective view showing a control unit 570, in one arrangement. The control unit 570 is shown in an enlarged view.

The control unit 570 may first include an LCD display screen 575. The screen 575 may be an interactive touch screen. Alternatively or in addition, the control unit 570 may have separate pressure-sensitive command buttons. These buttons may include, for example, numerical (or alpha-numerical) buttons 530, an "a.m." time button 532, and a "p.m." time button 534.

The control unit 570 may optionally have separate "Food" 522 and "Treat" 524 buttons. These allow the user to program the dispensing of food and treats separately. The control unit 570 may also have a "mode" button 532 which allows the user to cycle through feeding options. These feeding options are discussed in more detail below.

Figure 6:
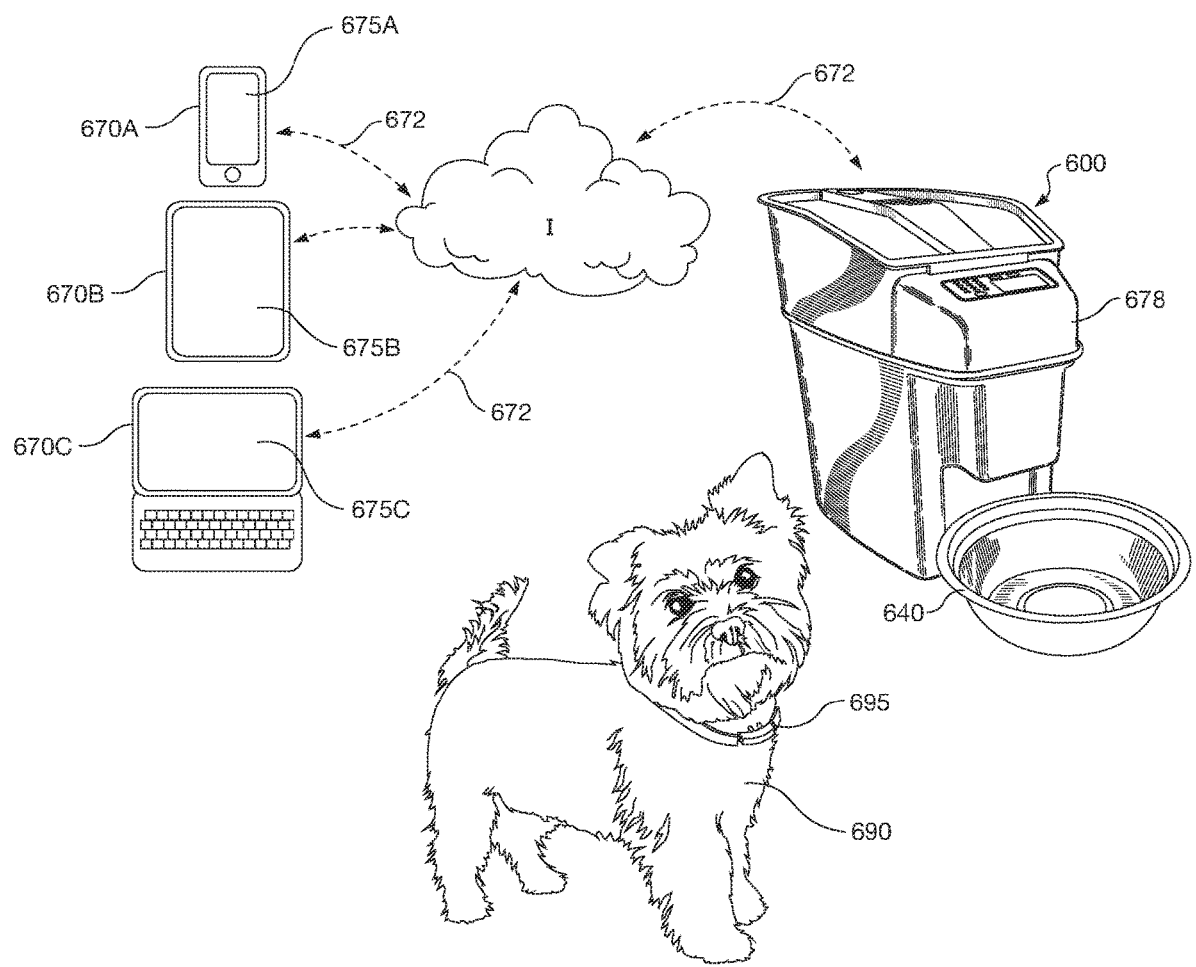
FIG. 6 is perspective view of an animal feeding system in electrical communication with alternative user control units. Here, the control units are remote control units.

As noted, a pet feeding system may alternatively be controlled remotely using a personal digital assistant, a portable tablet, or a computer. FIG. 6 is schematic view of an animal feeding system 600. This is intended to represent a system such as the feeding system 100 of FIG. 1. In the arrangement of FIG. 6, the animal feeding system 600 is in electrical communication with alternative user control units 670A, 670B, 670C.

A first control unit 670A represents a so-called smart phone or personal digital assistant. The personal digital assistant 670A includes a display 675A that serves as a user interface. Examples of a suitable personal digital assistant include the iPhone® from Apple, Inc. of Cupertino, Calif., the Samsung® Galaxy of Samsung Electronics Co., Ltd. of the Republic of Korea, and the Droid RAZR® provided by Motorola, Inc. of Schaumburg, Ill. (It is acknowledged that Motorola, Inc. (or its telecommunications-related assets) may now be owned by Google, Inc. and that trademarks are likely owned by a trademark (or other IP) holding company out of Cerritos, Calif.)

A second illustrative control unit 670B is a so-called tablet. The tablet 670B includes a display 675B that serves as a user interface. Examples of a suitable tablet include the iPad® available from Apple, Inc., the Google® Nexus tablet, the Samsung® Galaxy tablet, the Amazon® Kindle Fire tablet, the Lenovo® ThinkPad tablet, and the Microsoft® Surface tablet. Tablets are also considered personal digital assistants.

A third illustrative control unit 670C represents a general purpose computer. The computer 670C also includes a display 675C that serves as a user interface. General purpose computers may include the iMac® available from Apple, Inc., the Connectbook™ available from Hewlett-Packard Development Company, L.P. of Houston, Tex., the Inspiron® from Dell Computer Corporation of Round Rock, Tex., and the ATIV® from Samsung Electronics Co., Ltd.

Where a personal digital assistant 670A or a tablet 670B is used as the processor, a dedicated software application, or "App," will need to be uploaded. Where a general purpose computer 670C is used as the processor, a software package may be downloaded from the Internet or uploaded from a so-called thumb drive or other device having memory. More preferably, a web-based application is used.

In any of the remote devices 670A, 670B, 670C, a wireless signal 672 is sent to the feeding system 600. This will require the feeding system 600 to have a transceiver (shown generally at 678 but consistent with transceiver 164) capable of receiving wireless signals. Such signals are preferably cellular-based signals sent through a wireless telecommunications network. However, other communications protocols may be used such as a co-axial cable connection through a so-called cable subscription or satellite service. Alternatively, a traditional land-based telephone line may be used.

In one aspect, the animal feeding system 600 is able to determine the presence of an animal. An animal is shown schematically at 690. The animal 690 is wearing a collar having a communication device 695. The communication device 695 is in accordance with the device described in U.S. Pat. No. 8,436,735 entitled "System for Detecting Information Regarding an Animal and Communicating the Information to a Remote Location." The named inventor in that patent is Chris Mainini of Knoxville, Tenn. The '735 patent is assigned to Radio Systems Corporation and is incorporated herein by reference in its entirety.

In the arrangement of FIG. 6, the communication device 695 delivers a signal to the animal feeding system 600 confirming the presence of the animal in front of the bowl 640. When the presence of pet 690 is sensed, a certain portion of food may be dispensed or a certain treat may be dispensed by the conveyor belt 230. In one embodiment, the system 600 may be able to discern between several pets, each of whom is wearing a communication device 695. When the presence of a second pet (shown at 1190" in FIG. 11) is sensed, a different portion of food may be dispensed or a different type of treat may be dispensed. Operation of such a system is described further in U.S. Pat. Publ. No. 2011/0297090, entitled "Animal Feeding Apparatus." That application is also owned by Radio Systems Corporation and is incorporated herein by reference in its entirety.

Each of the remote devices 670A, 670B, 670C will have a display 675A, 675B, 675C. The display 675A, 675B, 675C will provide information to the pet owner about the status of the animal feeding system 600. Particularly, the display 675A, 675B, 675C will present a user interface that allows the pet owner to set or change the feeding mode and the feeding schedule.

In one aspect, the animal feeding system 600 includes a module (not shown). The module is offered as an aftermarket product that allows a feeding system that otherwise does not include a transceiver associated with the microprocessor 160 to communicate wirelessly with the remote device 670A, 670B, 670C.

FIGS. 7A through 12C present an animal feeding system 700 with different displays on a control unit 770. The control unit 770 is intended to represent a personal digital assistant. The control unit 770 may be either a so-called smart phone or a tablet. The control unit 770 serves as a user interface for ultimately sending signals 772 to the animal feeding device 700 according to programming instructions that have been input by the user.

The user control unit 770 is in communication with an animal feeding device 700. Preferably, communication takes place through a web-based platform, or application, that sends signals to the feeding device 700. Such signals may be through a telecommunications network "I."

Figure 7A:
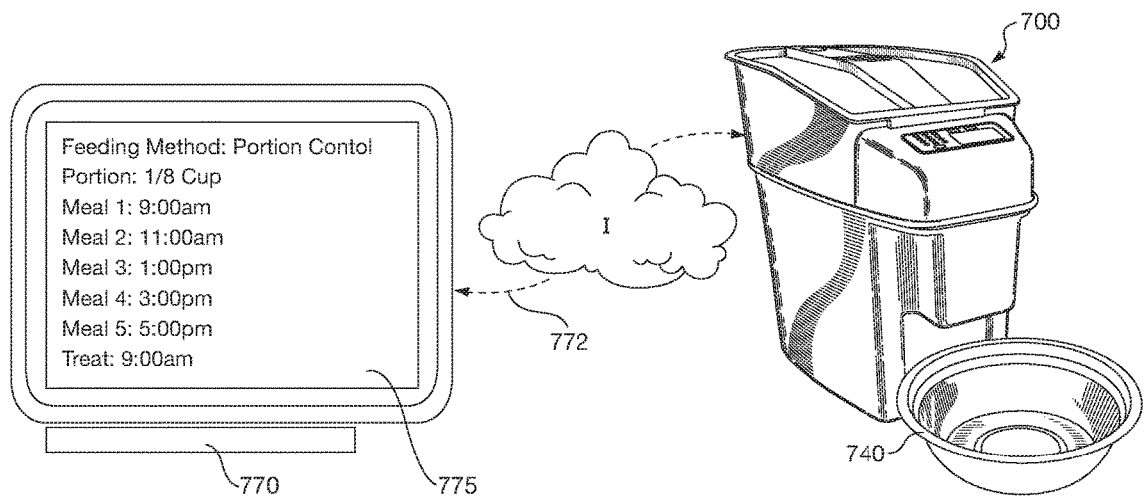
FIGS. 7A and 7B present schematic views of a conveyor-operated animal feeding system in wireless electrical communication with a remote user control unit. A display of the control unit is shown.

The displays on the control unit 770 demonstrate optional feeding modes and functions for the system 700, in different embodiments. FIG. 7A is a schematic view showing a first display 775 for the control unit 770. In the view of FIG. 7A, the display 775 presents a feeding schedule. The feeding schedule operates according to a portion-control feeding method. Using the control unit 770, the pet owner inputs a desired portion of food and the times of day for feeding. The pet owner may set as many feeding times per day as desired. The option is also available to repeat a designated cycle each day, or on certain days of the week. In the display 775, each portion is ⅛th of a cup, with feeding being on two hour increments from 9:00 am to 5:00 pm.

Figure 7B:
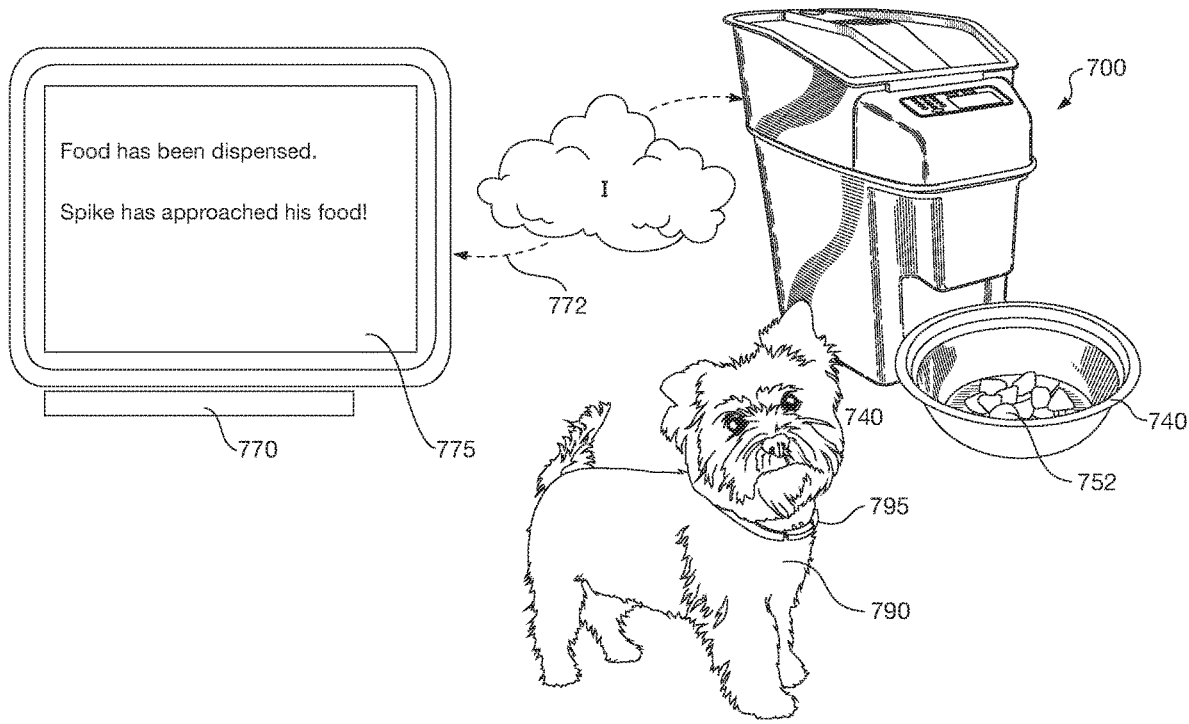

FIG. 7B is a second schematic view showing the control unit 770 of FIG. 7A in wireless communication with the animal feeding device 700. Here, a real time status report concerning feeding is shown in the display 775. The display 775 shows that food has been dispensed. In addition, the display 775 shows that the pet 790 has approached the feeding bowl 740.

In FIG. 7B, pellets 752 of dry food are shown in a feeding bowl 740. In addition, a pet 790 is positioned in front of the feeding bowl 740. The pet is wearing a communication device 795. The communication device may again be in accordance with the device described in U.S. Pat. Publ. No. 2008/0190379 entitled "System for Detecting Information Regarding an Animal and Communicating the Information to a Remote Location." The communication device 795 is worn by the pet 790 and communicates with the control unit 770, either directly or through the feeding system 700, to inform the control unit 770 that the pet 790 is in position to eat from the feeding bowl 740, or is at least in close proximity to the animal feeding device 700.

It is again observed that the pet 790 is fitted with a collar having a transmitter as the communication device 795. The transmitter is customized to communicate with the animal feeding device 700 through IR, Zigbee or Blue Tooth, or other wireless signal protocol. These signals inform the animal feeding device 700 that the pet 790 has approached the bowl 740.

It is preferred that the display 775 shows whenever food 752 has been dispensed. This is beneficial to the remote pet owner who is not home to see food in the bowl 740. Thus, the pet owner will receive a notification via a text message or through a software application on their personal digital assistant 770. Optionally, a notification will also indicate when the pet 790 has approached the bowl 740. These messages are again shown on the illustrative display 775 of FIG. 7B.

Figure 8A:
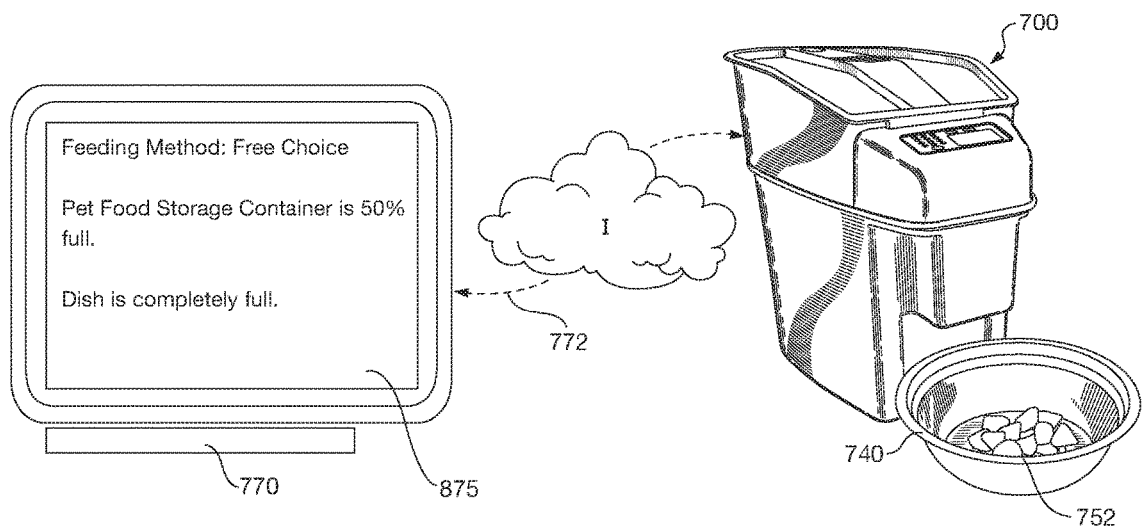
FIGS. 8A and 8B present additional schematic views of a conveyor-operated animal feeding system in wireless electrical communication with a remote user control unit. A display of the control unit is again shown.

FIG. 8A is another schematic view showing a display 875 for the control unit 770. The control unit 770 is again in communication with the animal feeding device 700 through a telecommunications network "I." In the view of FIG. 8A, the display 875 does not present a feeding schedule; instead, the system 700 is now programmed to keep the feeding bowl 740 substantially full. This is according to a free-choice feeding method as selected by the pet owner.

As shown in FIG. 8A, the bowl 740 has dog food 752 therein. The bowl 740 is optionally equipped with a weight sensor or an IR sensor that senses when the bowl 740 has dropped below a certain weight or when the food 752 has fallen to a certain level. At such points, the conveyor belt 230 is automatically activated to re-fill the bowl 740. Beneficially, the conveyor system 200 of the present invention is able to equate time of activation with volume of food dispensed.

In the display 875, the pet owner is informed that the food storage container 710 is 50% full. This is based on readings from a separate sensor. Such a sensor may also be a weight sensor that senses when the container 710 has dropped below a certain weight, or an IR sensor that senses when the food 752 in the container 710 has fallen to a certain level. The display 875 also informs the owner that the feeding bowl 740 is "completely full" of food 752. The owner receives this notification via text message or "app" message to be reassured that his or her pet has plenty of food.

Figure 8B:
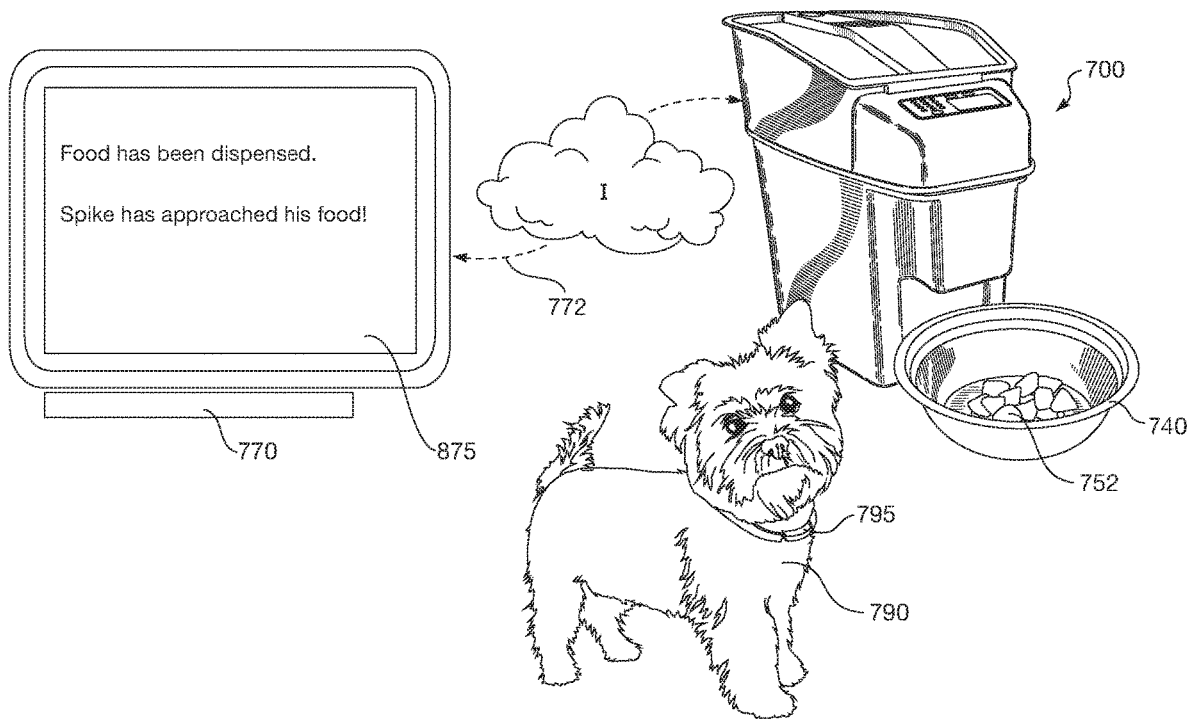

FIG. 8B is a second schematic view showing the control unit 770 in wireless communication with the animal feeding device 700. Here, a message is being shown in the display 875 that a pet has approached the bowl 740. The feeding bowl 740 remains full of dry pellets 752.

It is noted that in FIG. 8B, a pet is again shown schematically at 790. The pet 790 is positioned in front of the bowl 740. The pet 790 is wearing a communication device 795 in accordance with the Mainini device described in U.S. Pat. No. 8,436,735. The communication device 795 is worn by the pet 790 and communicates with the control unit 770, either directly or through the feeding system 700, to inform the control unit 770 that the pet 790 is in position to eat from the feeding bowl 740.

Figure 9A:
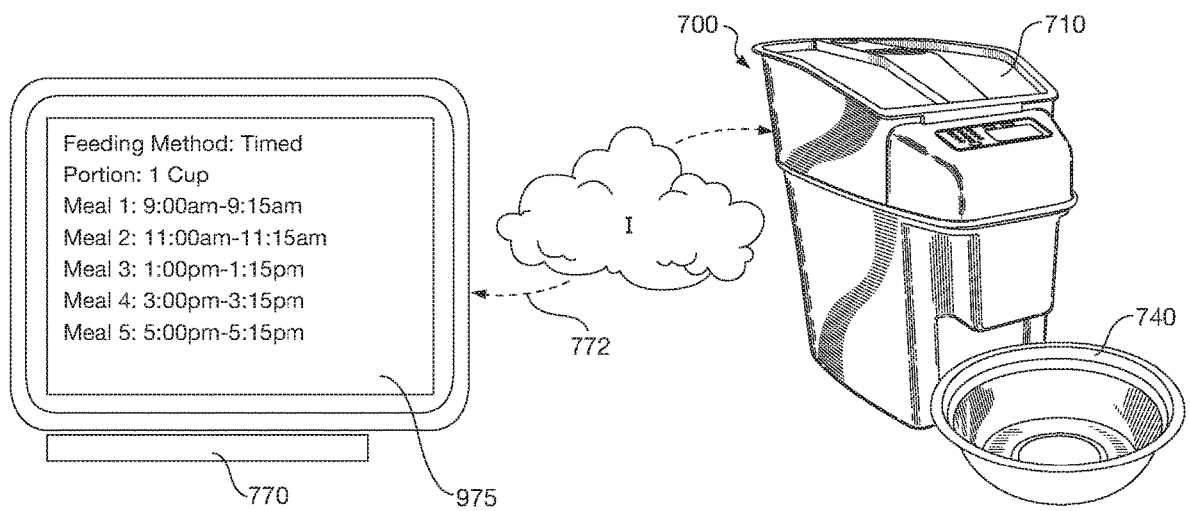
FIGS. 9A, 9B and 9C present additional schematic views of a conveyor-operated animal feeding system in wireless electrical communication with a remote user control unit. A display of the control unit is again shown.

FIG. 9A is another schematic view showing a display 975 for the control unit 770. The control unit 770 is again in communication with the animal feeding device 700 through a wireless communications network "I." In the view of FIG. 9A, the display 975 again presents a feeding schedule. Here, the feeding schedule offers food portions to be dispensed periodically in 1 cup increments. Feeding begins at 9:00 a.m., followed by feeding periods of 15 minutes every 105 minutes. Thus, food is available for a 15 minute period and then is removed from pet access.

In the view of FIG. 9A, the feeding bowl 740 is empty (or food is otherwise unavailable). In operation, the pet owner selects a time at which feeding is to be completed for each increment. This is done using the control unit 770. At the end of the feeding increment, a base in the bowl 740 is opened or tilted, causing food to be emptied from the bowl 740 and dropped into a storage area (not shown). The food may be retrieved by the owner later and returned to the container 710. As an alternative embodiment, a cover may rotate over the top of the bowl 740 between feeding increments. This may be, for example, in accordance with the teachings of U.S. Pat. No. 6,401,657, also owned by Radio Systems Corporation.

Figure 9B:
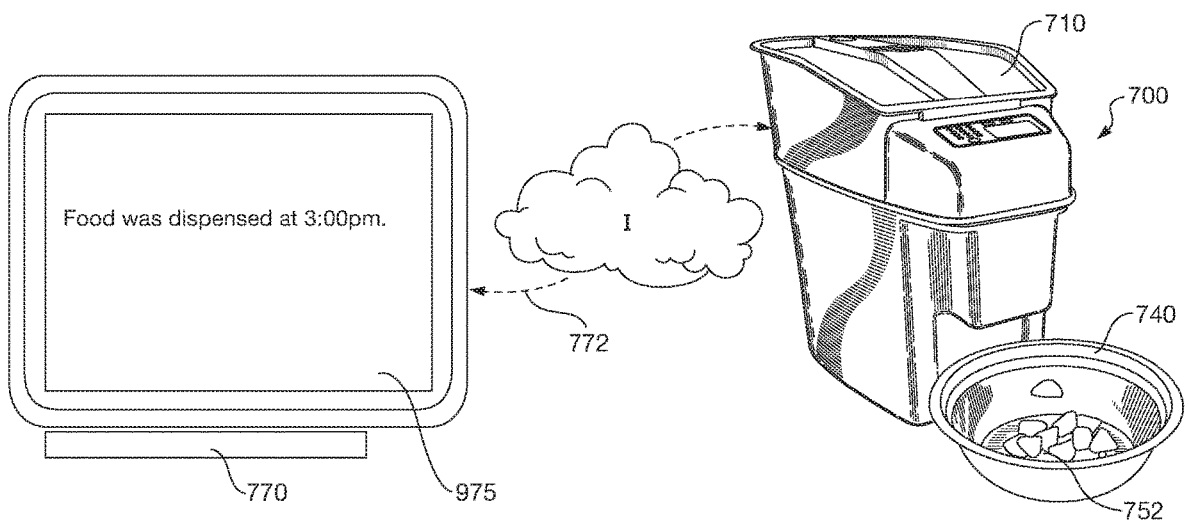

FIG. 9B is a second schematic view showing the control unit 770 in wireless communication with the animal feeding device 700. Here, a real time status report concerning feeding is shown in the display 975. The display 975 shows that food was dispensed at 3:00 p.m. The bowl 740 has pellets 752 in it for the pet 790.

Figure 9C:
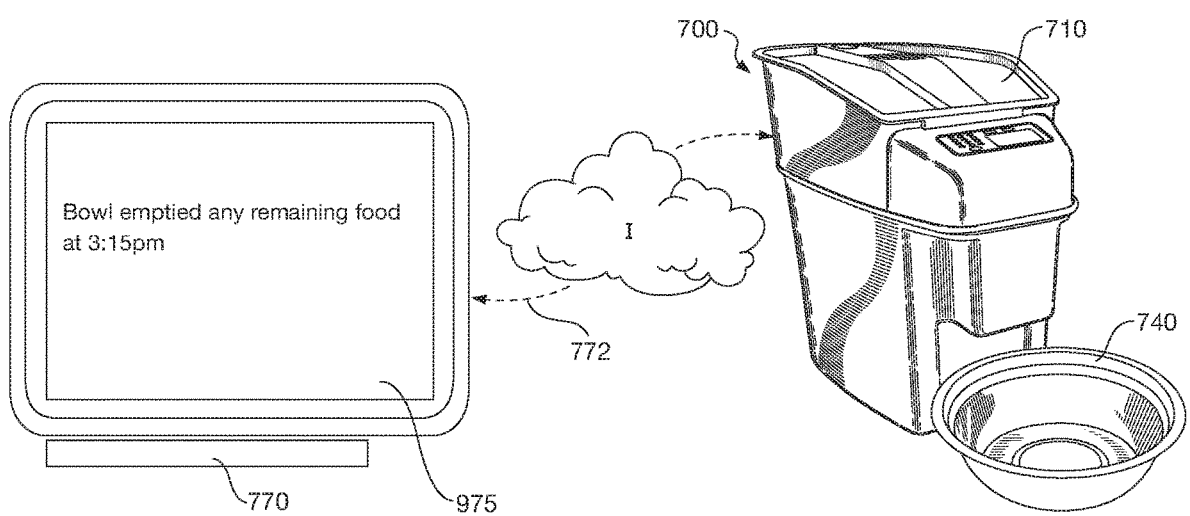

FIG. 9C provides a third schematic view of the control unit 770 in wireless communication with the animal feeding device 700. Here, a new real time status report concerning feeding is shown in the display 975. The display 975 shows that the feeding bowl 740 was emptied of any remaining food at 3:15 p.m. It can be seen in FIG. 9C that the bowl 740 has no pellets 752 in it for the pet.

Figure 10A:
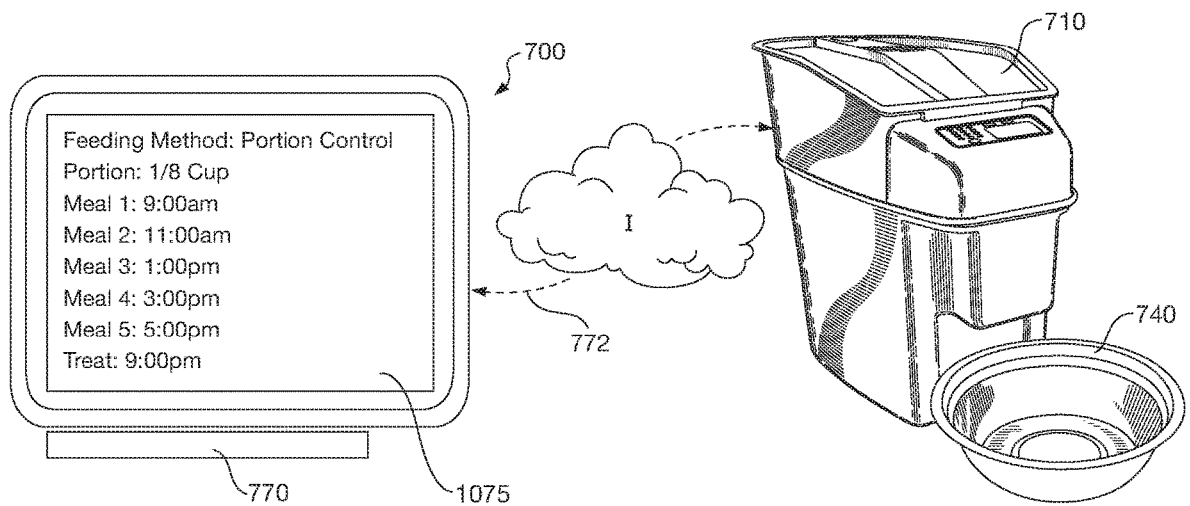
FIGS. 10A and 10B present additional schematic views of a conveyor-operated animal feeding system in wireless electrical communication with a remote user control unit. A display of the control unit is again shown.

FIG. 10A is another schematic view showing a display 1075 for the control unit 770. The control unit 770 is again in communication with the animal feeding device 700 through wireless signals 772. In the view of FIG. 10A, the display 1075 presents a new feeding schedule. The feeding schedule operates according to a portion-control feeding method, wherein each portion is ⅛th of a cup. Feeding takes place in two hour increments from 9:00 am to 5:00 pm.

The display 1075 of FIG. 10A differs from the display 775 of FIG. 7A in that a treat is scheduled to be dispensed at 9:00 p.m. In addition, the conveyor belt 230 is programmed to move slowly so that food is dispensed continuously but slowly over the course of a 10 to 15 minute period, depending on pet needs. This prevents the animal from gulping its food.

In FIG. 10A, a bowl 740 is shown with the animal feeding system 1000. The bowl 740 is empty as a treat has not yet been dispensed.

Figure 10B:
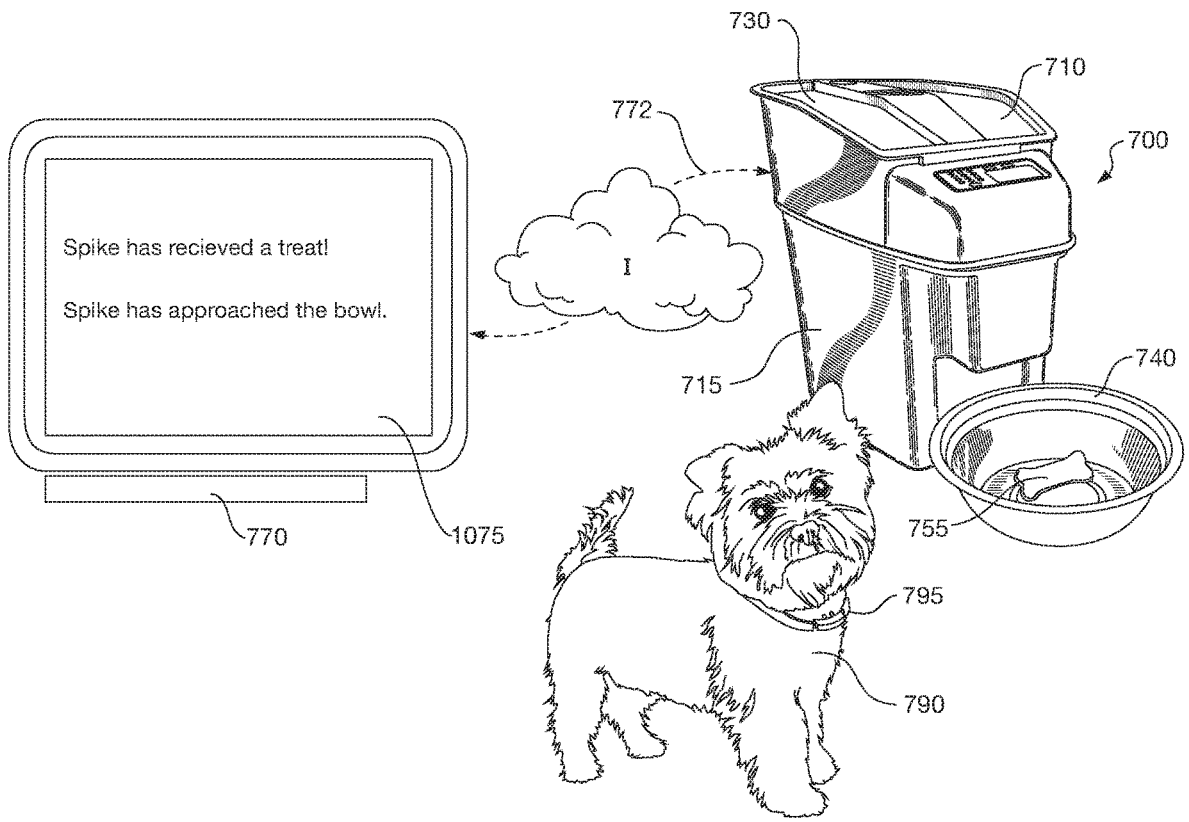

FIG. 10B is a second schematic view showing the control unit 770 in wireless communication with the animal feeding device 700. Here, a real time status report concerning feeding is shown in the display 1075. The display 1075 shows that a treat has been dispensed. "Spike has received a treat." In addition, the display 1075 shows that the pet has approached the bowl 740.

In FIG. 10B, a treat 755 is shown in the bowl 740. The treat 755 was dispensed from a treat container 715 associated with the dispensing system 700. In addition, the pet 790 is positioned in front of the bowl 740. The pet 790 is wearing a collar communication device 795 that electronically interfaces with the control unit 770.

Figure 11:
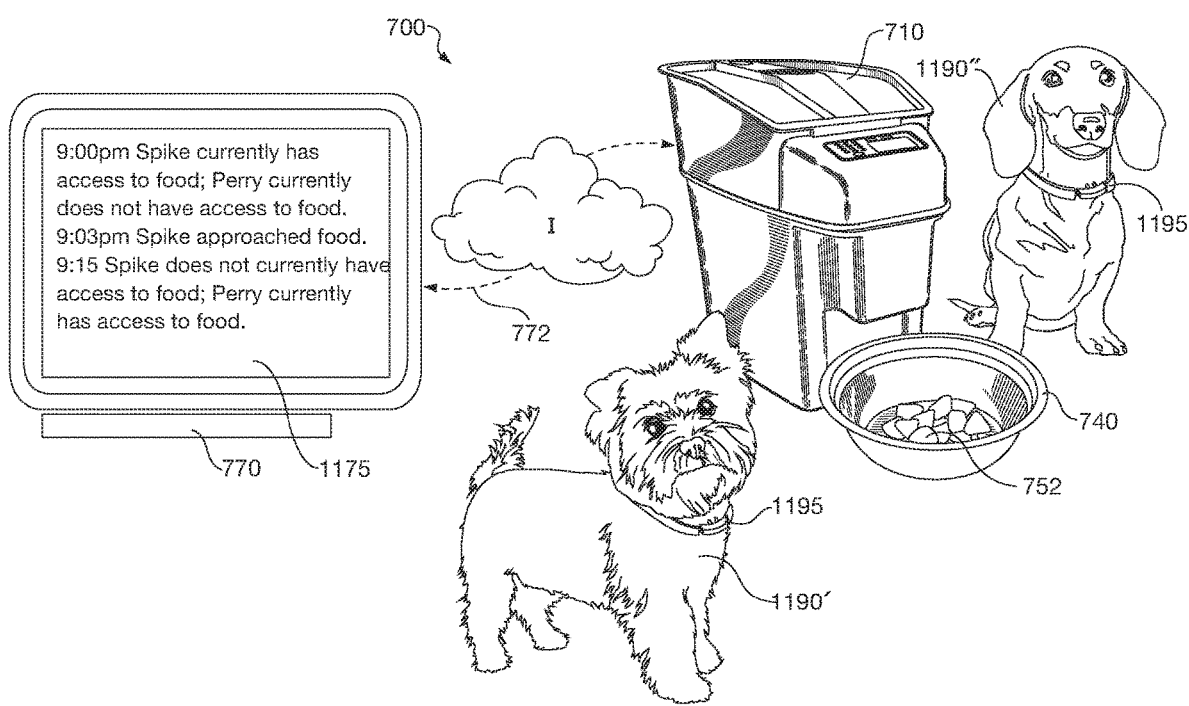
FIG. 11 is a schematic view showing a user control unit in wireless communication with a conveyor-operated animal feeding device. Here, a real time status report of feeding activity is provided on a display.

FIG. 11 is yet another schematic view of the control unit 770 in wireless communication with the animal feeding device 700. A display 1175 for the control unit 770 is seen. Here, a real time status report of feeding activity is provided on the display 1175. The display 1175 provides reports for two different animals, named Spike and Perry. The animals are also shown at 1190' and 1190".

In FIG. 11, pellets 752 of food have been dispensed into a feeding bowl 740. In addition, each of pets 1190' and 1190" has approached the bowl 740. Each pet 1190' and 1190" is wearing a communications device 1195 that electronically interfaces with the control unit 770. In one aspect, the feeding system 700 includes a sensor that senses when each animal is in immediate proximity to the bowl 740 through the communications device 1195, and then sends a signal 772 to the control unit 770.

According to the display 775, at 9:00 pm one animal 1190' (Spike) does not have access to the bowl 740, while the other animal 1190" (Perry) does have access to the bowl 740. However, at 9:15 pm Perry 1190" has access to the bowl 740 while Spike does not. This is a demonstration of a selective access feeding method.

Selective access may be accomplished in one of several ways. This may be by enclosing the feeding bowl 740 in a separate housing with a door that allows or restricts access based on reading the communication device 1195 on the pets 1190', 1190". Alternatively, the bowl 740 itself may be covered with a panel (not shown) that moves to cover or uncover the food 752 when triggered by a communications device 1195. Alternatively, the bowl 740 may move, such as by rotation, to a covered or uncovered position. Alternatively still, a stimulus mechanism on the collar may be activated when the animal comes into proximity to the feeding bowl 740 at the wrong time. Such a stimulus may include a noise or the delivery of a mild electrical stimulus sent through electrodes mounted on the collars.

As can be seen, a novel animal feeding system is offered herein. The feeding system offers improved mechanical features over existing devices, including a durable conveyor system that will not bind or become clogged because of lodged food pellets. Further, the feeding system enables a user to employ multiple feeding methods through a programmable control unit, including a slow-feed method which provides a timed distribution of food in small quantities. Still further, the feeding system provides two-way communication by plugging in a connected accessory, giving the pet owner the convenience of taking a non-connected product and creating a wireless connection with the pet owner using an application that can be uploaded onto a personal digital assistant, or accessed using a general purpose computer through a website.

A method of delivering dry pet food to an animal is also provided herein. The method generally includes providing a bowl. The bowl defines a wall and an interior basin for holding a dry pet food. The method also includes filling a container with the pet food. The food in the container is positioned to gravitationally fall into a receptacle below the container. The method also includes programming an animal feeding system that periodically activates a conveyor belt for transporting the dry pet food into the bowl.

The user may select from any of the following feeding methods:

(a) portion control feeding, wherein a designated amount of food is dispensed into the feeding bowl one or more times per day, such designated amount being less than a full volume of the feeding bowl;

(b) slow-feeding, wherein a designated amount of food is dispensed into the feeding bowl one or more times per day, but with the conveyor cycling at a substantially reduced rate to limit the presentation of food to the pet;

(c) free choice feeding, wherein a set portion of food is always available to the pet to eat from whenever they desire;

(d) timed feeding, wherein a set portion of food is available to the pet for a certain period of time, and then removed at the end of that set period of time;

(e) treat dispenser feeding, wherein a solid pet treat is dispensed automatically according to a timer, or immediately in response to a signal sent by the user through a remote control unit; and (f) selective access feeding, wherein the animal feeding system is able to distinguish between two or more pets such that a selected pet is unable to access a feeding bowl at certain times.

Figure 12A:
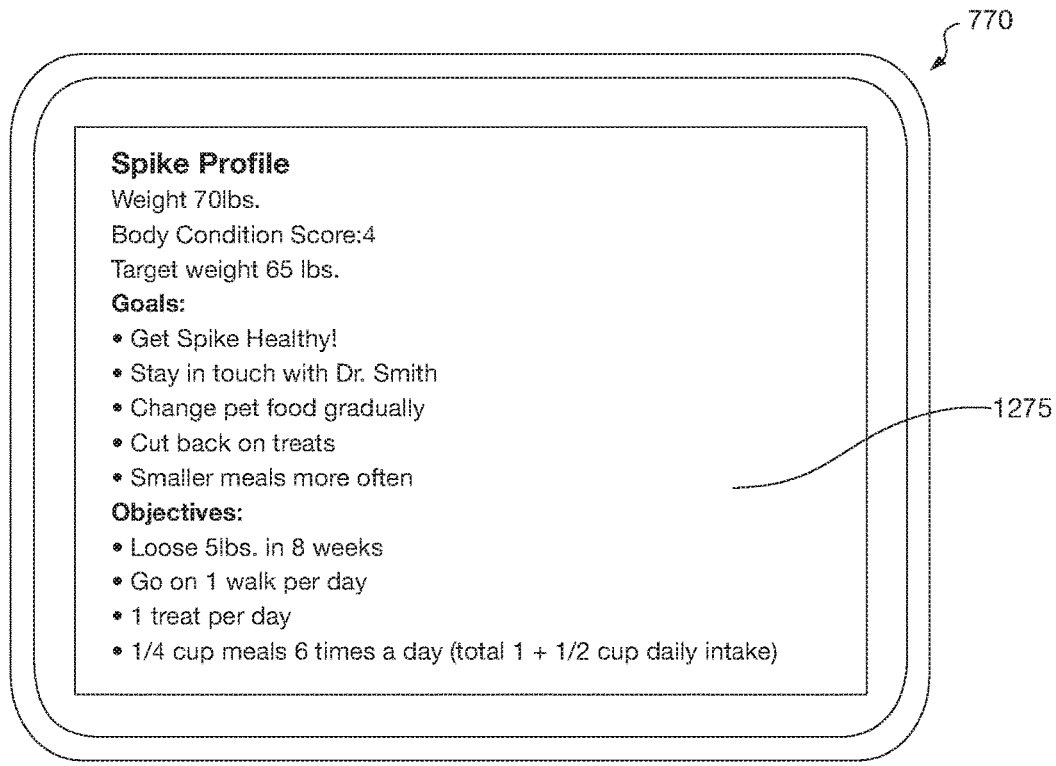
FIG. 12A presents an illustrative display from the user control unit of FIG. 11, showing health status and goals for a pet.

The present method also allows the pet owner to input data about a pet. The data appears on a display. FIG. 12A presents an illustrative display 1275 from a control unit 770. The display 1275 presents health status and goals for a pet.

Figure 12B:
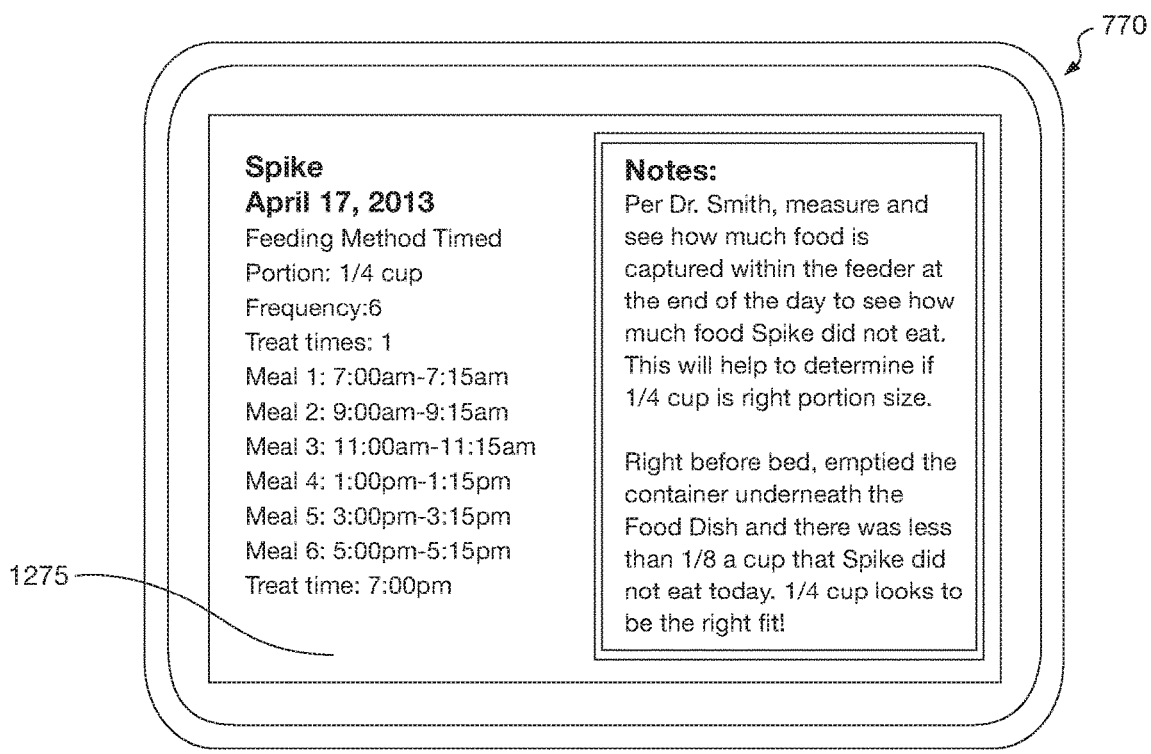
FIG. 12B presents another illustrative display from the control unit of FIG. 11, showing a feeding schedule and user notes.
Figure 12C:
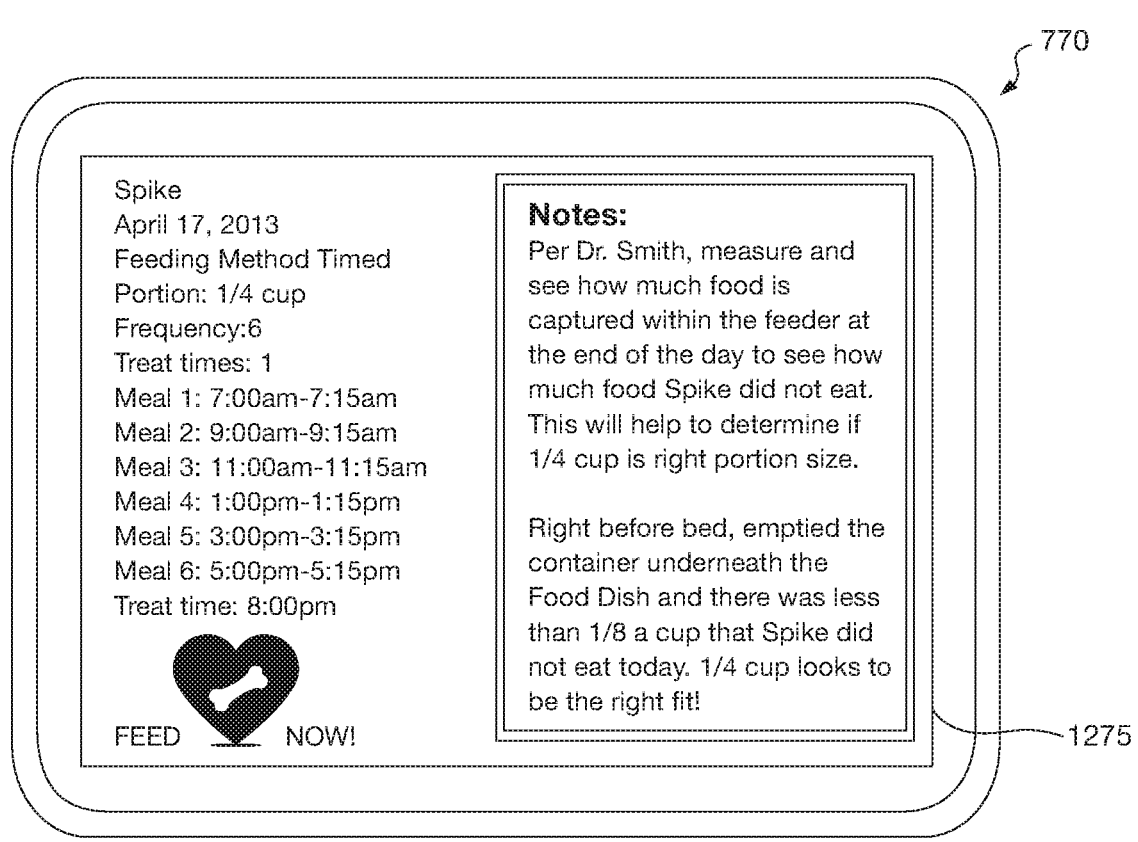
FIG. 12C presents still another view of the display from the control unit of FIG. 11. An emotional feed button is shown, ready to dispense a treat.

FIG. 12B presents the same display 1275. Here, the display 1275 shows a feeding schedule and user notes. FIG. 12C is still another view of the display 1275. Here, an emotional feed button is shown, ready to dispense a treat. User notes are also shown.

The display 1275 of FIGS. 12A, 12B and 12C demonstrate that the animal feeding systems herein may be used as part of a holistic weight management system. The weight management system enables the user to track, record, monitor and maintain their pet's weight and feeding routines. Such data can also be shared, reviewed and altered with the interaction of a veterinarian.

The automatic animal feeding system can be set up and operated locally through a control unit that is located on the device itself. In one embodiment, the pet owner can also attach a "module" that will allow the feeding device to be accessed via wireless communication. In this scenario, a software application may be downloaded to communicate with the module and to interface with and operate the animal feeding system remotely.

In certain embodiments, the system notifies the pet owner when food or a treat have been dispensed, as well as when the pet has approached the bowl (that is, when the pet is wearing a communications collar). In one aspect, the system will also alert the pet owner when the container and the bowl are at full, half full, or near empty status. If there is a power issue, the system will alert the owner as to the battery status.

Variations of the system and method for feeding an animal may fall within the spirit of the claims, below. It will be appreciated that the inventions are susceptible to modification, variation and change without departing from the spirit thereof.

We claim:

1. An animal feeding system, comprising:
   a housing, the housing having a food receptacle area which temporarily stores a quantity of dry pet food, and the housing also including a chute positioned closely adjacent a housing upper end;
   a container dimensioned to hold dry pet food in pellet form for a domestic pet, the container having a container upper end and a container lower end, with the container lower end having an opening through which the pet food travels into the housing, and wherein the container is removably coupled to the housing;
   a conveyor belt system for receiving the dry pet food as it gravitationally falls through the opening in the container, and for moving the dry pet food to a bowl, the conveyor belt system residing completely within the confines of the housing and including an endless conveyor belt, raised ribs spaced apart along the conveyor belt in parallel relation forming compartments of substantially identical size for holding the dry pet food as it is received from the container, stationary walls along the conveyor belt for retaining dry food and to further define the compartments, and a drive motor for causing cycling of the endless conveyor belt and for providing reciprocating motion to an agitator, wherein the reciprocating motion of the agitator assists movement of the dry pet food through the opening;
   and wherein:
      the conveyor belt is angled upward at least 25 degrees relative to horizontal forming lower and upper ends,
      the lower end of the conveyor belt is positioned within the housing food receptacle area and configured to pick up volumes of the pet food during the cycling into the compartments, while the upper end of the conveyor belt is configured to gravitationally drop pet food from the compartments through the housing chute and into the bowl during the cycling, wherein the picking up the volumes includes the raised ribs rotating through a portion of the food receptacle area,
      the raised ribs are about 0.75 to 2.5 inches in height, but the stationary walls along the conveyor belt extend above the raised ribs;
   a user control unit having an interface by which a user may program the animal feeding system to dispense food according to a schedule; and
   a processor in electrical communication with the motor configured to deliver start and stop signals to the motor in response to the schedule selected by the user.

2. The animal feeding system of claim 1, wherein the user control unit resides on the housing, and is in wired electrical communication with the processor for sending control signals to the processor.

3. The animal feeding system of claim 1, wherein:
the container resides on and is at least partially supported by the housing over the food receptacle area; and
the conveyor belt system is in the form of a cartridge within the housing, and the conveyor belt system is removably mounted to the housing, and the cartridge comprising:
a first end positioned below the lower end of the container and defining at least a part of the food receptacle of the housing,
a second end positioned opposite the first end and defining the chute, and
a first side wall and a second opposing side wall, each extending from the first end to the second end and defining the stationary walls.

4. The animal feeding system of claim 3, further comprising:
the feeding bowl, wherein the feeding bowl is positioned to gravitationally receive the dry pet food from the conveyor belt when the drive motor is actuated.

5. The animal feeding system of claim 1, wherein the user control unit resides remotely from the housing, and is in wireless electrical communication with the processor.

6. The animal feeding system of claim 5, further comprising:
a transceiver associated with the processor for receiving wireless signals.

7. The animal feeding system of claim 6, wherein:
the user control unit is a dedicated remote control having a transmitter configured to communicate with the transceiver through wireless signals.

8. The animal feeding system of claim 7, wherein the wireless signals are according to RF, Zigbee, Wi-Fi, or Blue-Tooth protocol.

9. The animal feeding system of claim 6, wherein the user control unit is a general purpose computer having uploaded operational software, and communicates with the transceiver associated with the processor via a telecommunications network.

10. The animal feeding system of claim 6, wherein:
the control unit is a personal digital assistant having a transceiver; and
the transceiver in the personal digital assistant communicates with the transceiver associated with the processor via a telecommunications network, or via wireless signals using a software application.

11. The animal feeding system of claim 3, wherein the drive motor comprises an electric drive motor that, upon actuation, rotates a drive shaft, which in turn imparts movement to the conveyor belt within the stationary walls.

12. The animal feeding system of claim 1, wherein by using the user control unit, a user may select from any of the following feeding methods:
(a) portion control feeding, wherein a designated amount of food is dispensed into the feeding bowl according to the schedule, such designated amount being less than a full volume of the feeding bowl; and
(b) free choice feeding, wherein a set portion of food is always available to the pet to eat from whenever they desire.

13. The animal feeding system of claim 12, wherein by using the user control unit, a user may further select from the following feeding method:
(c) timed feeding, wherein a set portion of food is available to the pet for a certain period of time, and then removed at the end of that set period of time.

14. The animal feeding system of claim 12, wherein by using the user control unit, a user may further select from the following feeding method:
(d) treat dispenser feeding, wherein a solid pet treat is dispensed automatically according to a timer, or immediately in response to a signal sent by the user through a remote control unit.

15. The animal feeding system of claim 12, wherein by using the user control unit, a user may further select from the following feeding method:
(e) selective access feeding, wherein the animal feeding system is able to distinguish between two or more pets such that a selected pet is unable to access a feeding bowl at certain times.

16. The animal feeding system of claim 4, wherein the bowl is integral with or connected to the housing.

17. A method of delivering dry pet food to a domesticated household animal, comprising:
providing a feeding bowl, wherein the bowl defines a wall and an interior basin for holding the pet food;
loading a container with pet food in pellet form such that the food in the container is positioned to gravitationally fall through a lower opening in the container and into a separate housing having a food receptacle area;
removably mounting the container onto the housing and over the food receptacle area; and
using a user control unit, programming an animal feeding system to activate a conveyor belt system for transporting the dry pet food from the housing food receptacle area and into the feeding bowl according to a feeding schedule;
wherein:
the conveyor belt system comprises an endless conveyor belt, raised ribs spaced apart along the conveyor belt in parallel relation forming compartments of substantially identical size for receiving the dry pet food, stationary walls along the conveyor belt for retaining the dry pet food and to further define the compartments, and a drive motor for causing cycling of the conveyor belt and for providing reciprocating motion to an agitator, wherein the reciprocating motion of the agitator assists movement of the dry pet food through the lower opening;
the endless conveyor belt is angled upward at least 25 degrees relative to horizontal forming lower and upper ends,
the lower end of the conveyor belt end picks up volumes of pet food during the cycling from the housing food receptacle area, while the upper end of the conveyor belt gravitationally drops volumes of food from the compartments onto a chute and into the bowl external to the housing during cycling of the conveyor belt in response to the programming, wherein the picking up the volumes includes the raised ribs rotating through a portion of the food receptacle area, and
the raised ribs are about 0.75 to 2.5 inches in height, but the stationary walls along the conveyor belt extend above the raised ribs.

18. The method of claim 17, wherein the volumes of food are based on running the conveyor belt system for a designated period of time according to the feeding schedule.

19. The method of claim 17, wherein the volumes of food are based on sensing a weight of the bowl or a weight of food in the bowl.

20. The method of claim 17, wherein:
the volumes of food are based on advancing the conveyor belt a designated distance; and
the conveyor belt system further comprises a sensor for sensing ribs as the ribs advance during cycling.

21. The method of claim 17, wherein:
the container and the user control unit are part of the animal feeding system;
the container is dimensioned to hold dry pet food in pellet form, the container having an upper end and a lower end;
the animal feeding system comprises a housing for at least partially enclosing the conveyor belt system; and
the animal feeding system further comprises a processor in electrical communication with the motor configured to deliver start and stop signals to the motor in response to the feeding schedule programmed by the user through the user control unit.

22. The method of claim 21, wherein
the user control unit resides on the housing, and is in wired electrical communication with the processor for sending control signals to the processor.

23. The method of claim 21, wherein the user control unit resides remotely from the animal feeding system, and is in wireless electrical communication with the processor.

24. The method of claim 23, further comprising:
a transceiver associated with the processor for receiving wireless signals.

25. The method of claim 24, wherein the user control unit is a dedicated remote control having a transmitter configured to communicate with the transceiver through wireless signals.

26. The method of claim 24, wherein the user control unit is a general purpose computer having uploaded operational software, and communicates with the transceiver via a telecommunications network.

27. The method of claim 24, wherein:
the control unit is a personal digital assistant having a transceiver; and
the transceiver in the personal digital assistant communicates with the transceiver associated with the processor via a telecommunications network, or via wireless signals using a software application.

28. The method of claim 24, wherein the drive motor comprises an electric drive motor that, upon actuation, rotates a drive shaft, which in turn imparts movement to the conveyor belt to cause the cycling.

29. The method of claim 28, wherein the conveyor belt system comprises:
a drive pulley mechanically turned by the drive shaft and residing at a lower end of the conveyor belt; and
an idle pulley that turns with and resides at an upper end of the conveyor belt; and
the conveyor system is in the form of a cartridge within the housing.

30. The method of claim 21, wherein by using the user control unit, a user may select from any of the following feeding methods:
(a) portion control feeding, wherein a designated amount of food is dispensed into the feeding bowl according to the schedule, such designated amount being less than a full volume of the feeding bowl; and (b) free choice feeding, wherein a set portion of food is always available to the pet to eat from whenever they desire.

31. The method of claim 30, wherein by using the user control unit, a user may further select from the following feeding method:
(c) timed feeding, wherein a set portion of food is available to the pet for a certain period of time, and then removed at the end of that set period of time.

32. The method of claim 30, wherein by using the user control unit, a user may further select from the following feeding method:
(d) treat dispenser feeding, wherein a solid pet treat is dispensed automatically according to a timer, or immediately in response to a signal sent by the user through a remote control unit.

33. The method of claim 30, further comprising:
fitting at least one animal with a communications device designed to send a signal that enables the animal feeding system to sense the presence of the fitted animal in immediate proximity to the bowl.

34. The method of claim 27, further comprising:
receiving a text message on a display associated with the user control unit in response to a sensor in electrical communication with the processor advising that (i) a pet has approached the feeding bowl, (ii) the container is at least 50% empty, (iii) a pet has access to the feeding bowl, (iv) a pet does not have access to the feeding bowl, or (v) the feeding bowl is substantially empty.

35. The animal feeding system of claim 5, further comprising:
a receptacle that forms at least a part of the housing, with the receptacle being configured to receive the lower end of the conveyor belt and also to receive at least a portion of the dry pet food as it gravitationally falls through the opening in the container.

36. The animal feeding system of claim 5, further comprising:
a mechanical agitator disposed at the lower end of the endless conveyor belt, the agitator defining an elongated tooth that extends upward into the opening of the container, wherein the agitator is pinned at the lower end and is configured to reciprocate about the pin during the cycling, wherein the reciprocating motion of the agitator assisting movement of the dry pet food includes moving and dislodging dry pet food pellets.

37. The method of claim 17, further comprising:
a mechanical agitator disposed at the lower end of the endless conveyor belt, the agitator defining an elongated tooth that extends upward into the lower opening of the container, wherein the agitator is pinned at a lower end and is configured to reciprocate about the pin during the cycling, wherein the reciprocating motion of the agitator assisting movement of the dry pet food includes moving and dislodging dry pet food pellets.

38. The method of claim 17, wherein:
the conveyor belt system is removably mounted to the housing,
the conveyor belt system is in the form of a cartridge within the housing, and comprises:
a first end positioned below the lower end of the container and defining at least a part of the food receptacle of the housing,
a second end positioned opposite the first end and defining the chute, and a first side wall and a second opposing side wall, each extending from the first end to the second end and defining the stationary walls.

* * * * *